US012053907B2

(12) United States Patent
Ikeda et al.

(10) Patent No.: US 12,053,907 B2
(45) Date of Patent: Aug. 6, 2024

(54) BUILDING MATERIAL MANUFACTURING APPARATUS AND BUILDING MATERIAL MANUFACTURING METHOD

(71) Applicant: NICHIHA CORPORATION, Nagoya (JP)

(72) Inventors: Satoshi Ikeda, Nagoya (JP); Kazuhisa Yoshida, Nagoya (JP); Hidenori Nishioka, Nagoya (JP); Hiroki Norita, Nagoya (JP)

(73) Assignee: NICHIHA CORPORATION, Nagoya (JP)

( * ) Notice: Subject to any disclaimer, the term of this patent is extended or adjusted under 35 U.S.C. 154(b) by 489 days.

(21) Appl. No.: 17/434,645

(22) PCT Filed: Mar. 18, 2020

(86) PCT No.: PCT/JP2020/012111
§ 371 (c)(1),
(2) Date: Aug. 27, 2021

(87) PCT Pub. No.: WO2020/203321
PCT Pub. Date: Oct. 8, 2020

(65) Prior Publication Data

US 2022/0176588 A1 Jun. 9, 2022

(30) Foreign Application Priority Data

Mar. 29, 2019 (JP) ................................ 2019-065834

(51) Int. Cl.
*B28B 13/02* (2006.01)
*B07B 1/48* (2006.01)
(Continued)

(52) U.S. Cl.
CPC ............ *B28B 13/029* (2013.01); *B07B 1/485* (2013.01); *B28B 1/16* (2013.01); *B28B 5/027* (2013.01)

(58) Field of Classification Search
CPC ......... B28B 13/029; B28B 1/16; B28B 5/027; B28B 5/022; B07B 1/485; B07B 1/4645;
(Continued)

(56) References Cited

U.S. PATENT DOCUMENTS 9,079,222 B2 * 7/2015 Burnett ................... B07B 13/16
2008/0190821 A1 * 8/2008 Eugster ..................... B03B 4/02
209/311

(Continued)

FOREIGN PATENT DOCUMENTS

JP H07-124926 A 5/1995
JP 2017-007229 A 1/2017
(Continued)

OTHER PUBLICATIONS

International Search Report for International Application No. PCT/JP2020/012111 dated Jun. 2, 2020 (2 sheets).
(Continued)

*Primary Examiner* — Gene O Crawford
*Assistant Examiner* — Muhammad Awais
(74) *Attorney, Agent, or Firm* — Kratz, Quintos & Hanson, LLP

(57) ABSTRACT

A building material manufacturing apparatus includes a sieve portion 10 and a receiver 30 that receives a building raw material M that has passed through the meshes of the sieve portion 10. The sieve portion 10 includes a series of sheets that are each capable of performing a wave motion when the apparatus is operating, that have an inclination, and that are arranged in a direction of the inclination. The series of sheets include a sieve sheet 12 and a sieve sheet 13
(Continued)

positioned below the sieve sheet 12. In the sieve sheet 12, meshes having an identical size are arranged at a regular pitch in a sheet width direction W. In the sieve sheet 13, meshes having two or more different sizes are arranged or a mesh region R1 and a non-mesh region R2 are arranged, in the sheet width direction W. The receiver 30 is movable below the series of sheets. The building material manufacturing method includes, by using the apparatus, forming a mat on the receiver 30, the mat including a first layer formed from a part of the building raw material M that has passed through the meshes of the sieve sheet 12 and a second layer formed from a part of the building raw material M that has passed through the meshes of the sieve sheet 13.

10 Claims, 16 Drawing Sheets

(51) Int. Cl.
*B28B 1/16* (2006.01)
*B28B 5/02* (2006.01)

(58) Field of Classification Search
CPC ... B07B 1/4672; B07B 1/4663; B07B 1/4609; B07B 1/46
USPC ................................ 209/311, 363, 405, 412
See application file for complete search history.

(56) References Cited

U.S. PATENT DOCUMENTS

2020/0215718 A1 7/2020 Ikeda
2020/0316815 A1 10/2020 Ikeda

FOREIGN PATENT DOCUMENTS

JP 2017007229 A * 1/2017
JP 2017-193181 A 10/2017
JP 2017193181 A * 10/2017

OTHER PUBLICATIONS

International Preliminary Report on Patentability for International Application No. PCT/JP2020/012111 dated Sep. 28, 2021 (5 sheets).
Written Opinion of the International Searching Authority for International Application No. PCT/JP2020/012111 dated Jun. 2, 2020 (4 sheets).

* cited by examiner (a)

(b)

(c)

BUILDING MATERIAL MANUFACTURING APPARATUS AND BUILDING MATERIAL MANUFACTURING METHOD

TECHNICAL FIELD

The present invention relates to an apparatus and a method for manufacturing a building material such as a building board.

BACKGROUND ART

Examples of a building material that is a building board for forming an outer wall or an inner wall of a building include inorganic material boards such as a fiber reinforced cement siding board and a ceramic board, a fiber board such as a particle board, and a resin board.

As a method for manufacturing building materials of the various types, a technique including the following steps is known: a step of forming a raw material mat by depositing a powdery raw material, which is a building material, that has been screened and that has a predetermined size on a receiver or the like while screening the powdery raw material by air-sorting; and a step of heat-pressing the raw material mat. For example, PTL 1 describes a building material manufacturing method in which such a technique is used.

CITATION LIST

Patent Literature

PTL 1: Japanese Unexamined Patent Application Publication No. 7-124926

SUMMARY OF INVENTION

Technical Problem

An existing manufacturing apparatus for carrying out the aforementioned building material manufacturing method includes, as a mechanism for the mat forming step, for example, a sieve portion that performs screening by air-sorting, a raw material supply portion for dropping and supplying a powdery raw material toward the sieve portion, and a receiver for receiving the raw material that has been screened and that has a predetermined size.

The sieve portion includes a blower that horizontally blows air to the powdery raw material that drops, and a sieve net that is disposed at a position where the mesh faces the air from the blower and that is inclined to a predetermined degree so as to become separated from the blower. When the apparatus is operating, the powdery raw material is dropped from the raw material supply portion toward a position between the blower and the sieve net, air is blown from the blower toward the sieve net, a part of the powdery raw material passes through the sieve net or the mesh of the sieve net and further drops to be received by a receiver (another part of the powdery raw material cannot pass through the sieve net and drops). Then, a raw material mat is formed as the part of the powdery raw material that has passed through the sieve net is deposited on the receiver.

With the existing building material manufacturing apparatus having such a mechanism, it is difficult to vary the building raw material deposit amount on the receiver in the receiver width direction corresponding to the width direction of the sieve net. When such an apparatus forms a raw material mat on a receiver by using a template that has a depression/protrusion pattern, which corresponds to a design surface of a building material to be manufactured, in an inner surface thereof as the receiver, a building material is deposited substantially uniformly on the depressions and on the protrusions of the inner surface of the receiver. In a building material that is obtained by heat-pressing a raw material mat formed in this way, a difference in density of texture is likely to be generated between a part where a depression is formed and a part where a protrusion is formed on the design surface. A building material having a large difference in density is not preferable because a crack tends to occur.

On the other hand, it may be possible to provide a building material having high strength and high waterproof performance by forming end portions of the building material to have high density. However, with the existing building material manufacturing apparatus, with which it is difficult to vary the building raw material deposit amount on the receiver in the receiver width direction, it is difficult to form the end portions of the building material to have high density while providing the end portions with sufficient thickness.

The present invention has been made under such a background, and an object thereof is to provide a building material manufacturing apparatus and a building material manufacturing method each of which is suitable to vary, in a receiver width direction, a building raw material deposit amount on a building material forming receiver that receives a building raw material under a sieve portion that screens the building raw material.

Solution to Problem

According to a first aspect of the present invention, a building material manufacturing apparatus is provided. The building material manufacturing apparatus includes a sieve portion and a receiver.

The sieve portion includes a series of sheets. The series of sheets are each capable of performing a wave motion when the apparatus is operating, have an inclination, and are arranged in a direction of the inclination. The series of sheets include a first sieve sheet and a second sieve sheet that is positioned below the first sieve sheet. The first sieve sheet is a sheet in which a plurality of meshes having an identical size are arranged at a regular pitch in a sheet width direction of the series of sheets. The second sieve sheet is a sheet (first type) in which a plurality of meshes having two or more different sizes are arranged in the sheet width direction, or is a sheet (second type) that has a mesh region and a non-mesh region that are arranged in the sheet width direction. The sheet width direction is, for example, a direction perpendicular to the direction in which the series of sheets are arranged.

In the present invention, a wave motion of a sheet is, for example, a motion in which a sheet repeats vibration in the thickness direction thereof and that has antinodes. The speed of the wave motion increases as the period of the vibration decreases. Such a wave motion is realized, for example, by operating a vibrator such as an eccentric vibrator that is coupled to each sheet via a predetermined motive power transmission mechanism.

The receiver is for receiving a building raw material that has passed through the meshes of the sieve portion, and is movable under the series of sheets.

When the building material manufacturing apparatus is operating, in a state in which each of the series of sheets of the sieve portion is performing a wave motion as described above, a building raw material such as a powdery raw material is dropped onto a sheet at, for example, an upper end in the inclination direction of the series of sheets, and the raw material is supplied to the sieve portion. The supplied building raw material is a mixture of particles having various particle sizes. In the sieve portion of the present apparatus, such a building raw material is screened by each sieve sheet included in the series of sheets in the process of moving downward on the series of sheets while being pulverized by collision with the series of sheets in a state of performing a wave motion.

A part of the building raw material that has been screened by the first sieve sheet and thus passed through the meshes of the first sieve sheet can be deposited on the receiver at a position below the first sieve sheet. In the first sieve sheet, as described above, a plurality of meshes having an identical size are arranged at a regular pitch in the sheet width direction. The building raw material that has passed through the meshes of the first sieve sheet is substantially uniformly deposited on the receiver, and forms a first layer whose thickness in the receiver width direction corresponding to the sheet width direction is substantially uniform.

A part of the building raw material that has been screened by the second sieve sheet and thus passed through the meshes of the second sieve sheet can be deposited above the first layer on the receiver at a position below the second sieve sheet. A part of the building raw material that has passed through the meshes of the second sieve sheet forms a second layer above the first layer.

In a case where the second sieve sheet is a sheet of the first type (a sheet in which a plurality of meshes having two or more different sizes are arranged in the sheet width direction), regarding the building raw material that forms the second layer above the first layer, the deposit amount is larger below a larger mesh of the second sieve sheet, and the deposit amount is smaller below a smaller mesh of the second sieve sheet. That is, the raw material mat that has such a second layer, which functions also as a building raw material deposit amount adjustment layer, in addition to the aforementioned first layer and that is formed on the receiver is a raw material mat such that the building raw material deposit amount is varied in the receiver width direction.

In a case where the second sieve sheet is a sheet of the second type (a sheet that has a mesh region and a non-mesh region that are arranged in the sheet width direction), while the second layer is formed as the building raw material is deposited above the first layer below the mesh region of the second sieve sheet, the building raw material is not substantially deposited below the non-mesh region of the second sieve sheet. That is, the raw material mat that has such a second layer, which functions also as a building raw material deposit amount adjustment layer, in addition to the aforementioned first layer and that is formed on the receiver is a raw material mat such that the building raw material deposit amount is varied in the receiver width direction.

In the case where the second sieve sheet is a sheet of the second type, the second sieve sheet may have a mesh region in which a plurality of meshes having two or more different sizes are arranged in the sheet width direction. With such a second sieve sheet, the aforementioned advantageous effects of the case where the second sieve sheet is a sieve sheet of the first type and the aforementioned advantageous effects of the case where the second sieve sheet is a sieve sheet of the second type jointly occur.

As described above, the building material manufacturing apparatus is suitable to vary, in the receiver width direction, the building raw material deposit amount on the building material forming receiver, which receives the building raw material under the sieve portion that screens the building raw material, while mechanically classifying the building raw material.

Such a building material manufacturing apparatus is suitable to manufacture a building material having a depression/protrusion pattern in a design surface thereof while suppressing nonuniformity in density. An example is as follows.

In the present building material manufacturing apparatus, when forming a raw material mat on a receiver by using a template, which has a depression/protrusion pattern for a building material design surface in an inner surface thereof, as the receiver, a second sieve sheet of the first type or the second type that can vary the building raw material deposit amount in accordance with the depression/protrusion pattern is used together with the template. The second sieve sheet of the first type has, for example, a relatively large mesh at a part corresponding to a depression in the inner surface of the receiver and has a relatively small mesh at a part corresponding to a protrusion on the inner surface of the receiver. The second sieve sheet of the second type has, for example, a mesh region at a part corresponding to a depression in the inner surface of the receiver and has a non-mesh region at a part corresponding to a protrusion on the inner surface of the receiver.

By using such a second sieve sheet in the present apparatus, it is possible to form a raw material mat in which the building raw material deposit amount on the receiver is varied in the receiver width direction in accordance with the depression/protrusion pattern of the inner surface of the receiver. By heat-pressing such a raw material mat, it is possible to manufacture from the raw material mat a building material in which difference in density of texture between a part where a depression is formed in a building material design surface and a part where a protrusion is formed on the building material design surface is suppressed, that is, a building material having low nonuniformity in density. A building material having low nonuniformity in density is resistant to cracking and thus is preferable.

The building material manufacturing apparatus is suitable to manufacture a building material that has end portions having sufficient thickness and high density at both ends thereof in the receiver width direction. For example, with the present building material manufacturing apparatus, the raw material mat is formed on the receiver by using, as the second sieve sheet, a sheet that has mesh regions at both end portions thereof in the sheet width direction and has at least one non-mesh region between the mesh regions. In this case, in a raw material mat formed on the receiver, the building raw material deposit amount at both end portions (parts corresponding to the mesh regions) in the receiver width direction is larger than the building raw material deposit amount at a part corresponding to the non-mesh region.

By heat-pressing such a raw material mat, it is easy to manufacture from the raw material mat a building material having end portions that have sufficient thickness and high density at both ends thereof in the receiver width direction. Forming end portions of a building material to have high density is suitable to achieve high strength and high waterproof performance in the building material.

In the present building material manufacturing apparatus, preferably, a size of each mesh of the second sieve sheet is larger than a size of each mesh of the first sieve sheet.

Such a configuration is suitable to form, on the receiver, a raw material mat including a first layer that has a highly uniform thickness in the receiver width direction and that is composed of a relatively fine building raw material and a second layer that functions also as a building raw material deposit amount adjustment layer and that is composed of a relatively coarse building raw material. Accordingly, the configuration is suitable to form, on the receiver, a raw material mat including a first layer composed of a relatively fine building raw material and a second layer composed of a relatively coarse building raw material, while varying the building raw material deposit amount in the receiver width direction.

The first layer in the raw material mat, which is composed of a relatively fine building raw material, is suitable for a surface layer that has a denser texture and easily provides high waterproof performance, in the building material that is formed by heat-pressing the raw material mat. The second layer in the raw material mat, which is composed of a relatively coarse building raw material, is suitable for a core layer that has a looser texture and easily provides high cushioning ability, in the building material that is formed by heat-pressing the raw material mat.

In the present building material manufacturing apparatus, preferably, the second sieve sheet has the mesh region in each of two end portions thereof in the sheet width direction and has at least one of the non-mesh region between the mesh regions.

As described above, such a configuration is suitable to manufacture a building material that has end portions having sufficient thickness and high density at both ends thereof in the receiver width direction.

In the present building material manufacturing apparatus, preferably, the series of sheets include a third sieve sheet that is positioned below the second sieve sheet, the third sieve sheet being a sheet in which a plurality of meshes having an identical size, which is larger than a size of each mesh of the first sieve sheet, are arranged at a regular pitch in the sheet width direction.

Such a configuration is suitable to form, on the receiver, a raw material mat including a first layer that has a highly uniform thickness in the receiver width direction and that is composed of a relatively fine building raw material, a second layer that functions also as a building raw material deposit amount adjustment layer and that is composed of a relatively coarse building raw material, and a third layer that has a highly uniform thickness in the receiver width direction and that is composed of a relatively coarse building raw material. Accordingly, the configuration is suitable to form, on the receiver, a raw material mat including a first layer composed of a relatively fine building raw material and a second layer and a third layer composed of a relatively coarse building raw material, while varying the building raw material deposit amount in the receiver width direction.

In the present building material manufacturing apparatus, preferably, the series of sheets include a third sieve sheet that is positioned between the first sieve sheet and the second sieve sheet, the third sieve sheet being a sheet in which a plurality of meshes having an identical size, which is larger than a size of each mesh of the first sieve sheet, are arranged at a regular pitch in the sheet width direction.

Such a configuration is suitable to form, on the receiver, a raw material mat including a first layer that has a highly uniform thickness in the receiver width direction and that is composed of a relatively fine building raw material, a third layer that has a highly uniform thickness in the receiver width direction and that is composed of a relatively coarse building raw material, and a second layer that functions also as a building raw material deposit amount adjustment layer and that is composed of a relatively coarse building raw material. Accordingly, the configuration is suitable to form, on the receiver, a raw material mat including a first layer composed of a relatively fine building raw material and a third layer and a second layer composed of a relatively coarse building raw material, while varying the building raw material deposit amount in the receiver width direction.

According to a second aspect of the present invention, a building material manufacturing method is provided. The manufacturing method is implemented by using the following sieve portion and receiver.

The sieve portion includes a series of sheets. The series of sheets have an inclination and are arranged in a direction of the inclination. The series of sheets include a first sieve sheet and a second sieve sheet that is positioned below the first sieve sheet. The first sieve sheet is a sheet in which a plurality of meshes having an identical size are arranged at a regular pitch in a sheet width direction of the series of sheets. The second sieve sheet is a sheet (first type) in which a plurality of meshes having two or more different sizes are arranged in the sheet width direction, or is a sheet (second type) that has a mesh region and a non-mesh region that are arranged in the sheet width direction. The sheet width direction is, for example, a direction perpendicular to the direction in which the series of sheets are arranged.

The receiver is for receiving a building raw material that has passed through the meshes of the sieve portion, and is movable under the series of sheets.

With the manufacturing method, in a state in which each of the series of sheets of the sieve portion is performing a wave motion as described above, a building raw material such as a powdery raw material is dropped onto a sheet at, for example, an upper end in the inclination direction of the series of sheets, and the raw material is supplied to the sieve portion. The supplied building raw material is a mixture of particles having various particle sizes. In the sieve portion of the method, such a building raw material is screened by each sieve sheet included in the series of sheets in the process of moving downward on the series of sheets while being pulverized by collision with the series of sheets in a state of performing a wave motion (screening).

The manufacturing method includes forming, on the receiver, a mat including a first layer formed from a building raw material that has passed through the meshes of the first sieve sheet and a second layer formed above the first layer from a building raw material that has passed through the meshes of the second sieve sheet. As the raw material mat is subjected to a heat-pressing step, a predetermined building material as a board is manufactured.

In the building material manufacturing method, a part of the building raw material that has been screened by the first sieve sheet and thus passed through the meshes of the first sieve sheet can be deposited on the receiver at a position below the first sieve sheet. In the first sieve sheet, as described above, a plurality of meshes having an identical size are arranged at a regular pitch in the sheet width direction. The building raw material that has passed through the meshes of the first sieve sheet is substantially uniformly deposited on the receiver, and forms a first layer whose thickness in the receiver width direction is substantially uniform.

In the building material manufacturing method, a part of the building raw material that has been screened by the second sieve sheet and thus passed through the meshes of the second sieve sheet can be deposited above the first layer on the receiver at a position below the second sieve sheet. A part of the building raw material that has passed through the meshes of the second sieve sheet forms a second layer above the first layer.

In a case where the second sieve sheet is a sheet of the first type (a sheet in which a plurality of meshes having two or more different sizes are arranged in the sheet width direction), regarding the building raw material that forms the second layer above the first layer, the deposit amount is larger below a larger mesh of the second sieve sheet, and the deposit amount is smaller below a smaller mesh of the second sieve sheet. That is, the raw material mat that has such a second layer, which functions also as a building raw material deposit amount adjustment layer, in addition to the aforementioned first layer and that is formed on the receiver is a raw material mat such that the building raw material deposit amount is varied in the receiver width direction.

In a case where the second sieve sheet is a sheet of the second type (a sheet that has a mesh region and a non-mesh region that are arranged in the sheet width direction), while the second layer is formed as the building raw material is deposited above the first layer below the mesh region of the second sieve sheet, the building raw material is not substantially deposited below the non-mesh region of the second sieve sheet. That is, the raw material mat that has such a second layer, which functions also as a building raw material deposit amount adjustment layer, in addition to the aforementioned first layer and that is formed on the receiver is a raw material mat such that the building raw material deposit amount is varied in the receiver width direction.

In the case where the second sieve sheet is a sheet of the second type, the second sieve sheet may have a mesh region in which a plurality of meshes having two or more different sizes are arranged in the sheet width direction. With such a second sieve sheet, the aforementioned advantageous effects of the case where the second sieve sheet is a sieve sheet of the first type and the aforementioned advantageous effects of the case where the second sieve sheet is a sieve sheet of the second type jointly occur.

As described above, the building material manufacturing method is suitable to vary, in the receiver width direction, the building raw material deposit amount on the building material forming receiver, which receives the building raw material under the sieve portion that screens the building raw material, while mechanically classifying the building raw material. In the same way as described above regarding the first aspect of the present invention, the method is suitable to manufacture a building material having a depression/protrusion pattern in a design surface thereof while suppressing nonuniformity in density, and is also suitable to manufacture a building material that has end portions having sufficient thickness and high density at both ends thereof in the receiver width direction.

In the present building material manufacturing method, preferably, a size of each mesh of the second sieve sheet is larger than a size of each mesh of the first sieve sheet.

Such a configuration is suitable to form, on the receiver, a raw material mat including a first layer that has a highly uniform thickness in the receiver width direction and that is composed of a relatively fine building raw material and a second layer that functions also as a building raw material deposit amount adjustment layer and that is composed of a relatively coarse building raw material. Accordingly, the configuration is suitable to form, on the receiver, a raw material mat including a first layer composed of a relatively fine building raw material and a second layer composed of a relatively coarse building raw material, while varying the building raw material deposit amount in the receiver width direction.

In the present building material manufacturing method, preferably, the second sieve sheet has the mesh region in each of two end portions thereof in the sheet width direction and has at least one of the non-mesh region between the mesh regions.

Such a configuration is suitable to manufacture a building material that has end portions having sufficient thickness and high density at both ends thereof in the receiver width direction.

In the present building material manufacturing method, preferably, the series of sheets include a third sieve sheet that is positioned below the second sieve sheet, the third sieve sheet being a sheet in which a plurality of meshes having an identical size, which is larger than a size of each mesh of the first sieve sheet, are arranged at a regular pitch in the sheet width direction; and the method includes forming, on the receiver, a mat including a first layer formed from a building raw material that has passed through the meshes of the first sieve sheet, a second layer formed above the first layer from a building raw material that has passed through the meshes of the second sieve sheet, and a third layer formed above the second layer from a building raw material that has passed through the meshes of the third sieve sheet.

Such a configuration is suitable to form, on the receiver, a raw material mat including a first layer that has a highly uniform thickness in the receiver width direction and that is composed of a relatively fine building raw material, a second layer that functions also as a building raw material deposit amount adjustment layer and that is composed of a relatively coarse building raw material, and a third layer that has a highly uniform thickness in the receiver width direction and that is composed of a relatively coarse building raw material. Accordingly, the configuration is suitable to form, on the receiver, a raw material mat including a first layer composed of a relatively fine building raw material and a second layer and a third layer composed of a relatively coarse building raw material, while varying the building raw material deposit amount in the receiver width direction.

In the present building material manufacturing method, preferably, the series of sheets include a third sieve sheet that is positioned between the first sieve sheet and the second sieve sheet, the third sieve sheet being a sheet in which a plurality of meshes having an identical size, which is larger than a size of each mesh of the first sieve sheet, are arranged at a regular pitch in the sheet width direction; and the method includes forming, on the receiver, a mat including a first layer formed from a building raw material that has passed through the meshes of the first sieve sheet, a third layer formed above the first layer from a building raw material that has passed through the meshes of the third sieve sheet, and a second layer formed above the third layer from a building raw material that has passed through the meshes of the second sieve sheet.

Such a configuration is suitable to form, on the receiver, a raw material mat including a first layer that has a highly uniform thickness in the receiver width direction and that is composed of a relatively fine building raw material, a third layer that has a highly uniform thickness in the receiver width direction and that is composed of a relatively coarse building raw material, and a second layer that functions also as a building raw material deposit amount adjustment layer and that is composed of a relatively coarse building raw material. Accordingly, the configuration is suitable to form, on the receiver, a raw material mat including a first layer composed of a relatively fine building raw material and a third layer and a second layer composed of a relatively coarse building raw material, while varying the building raw material deposit amount in the receiver width direction.

DESCRIPTION OF EMBODIMENTS

Figure 1:
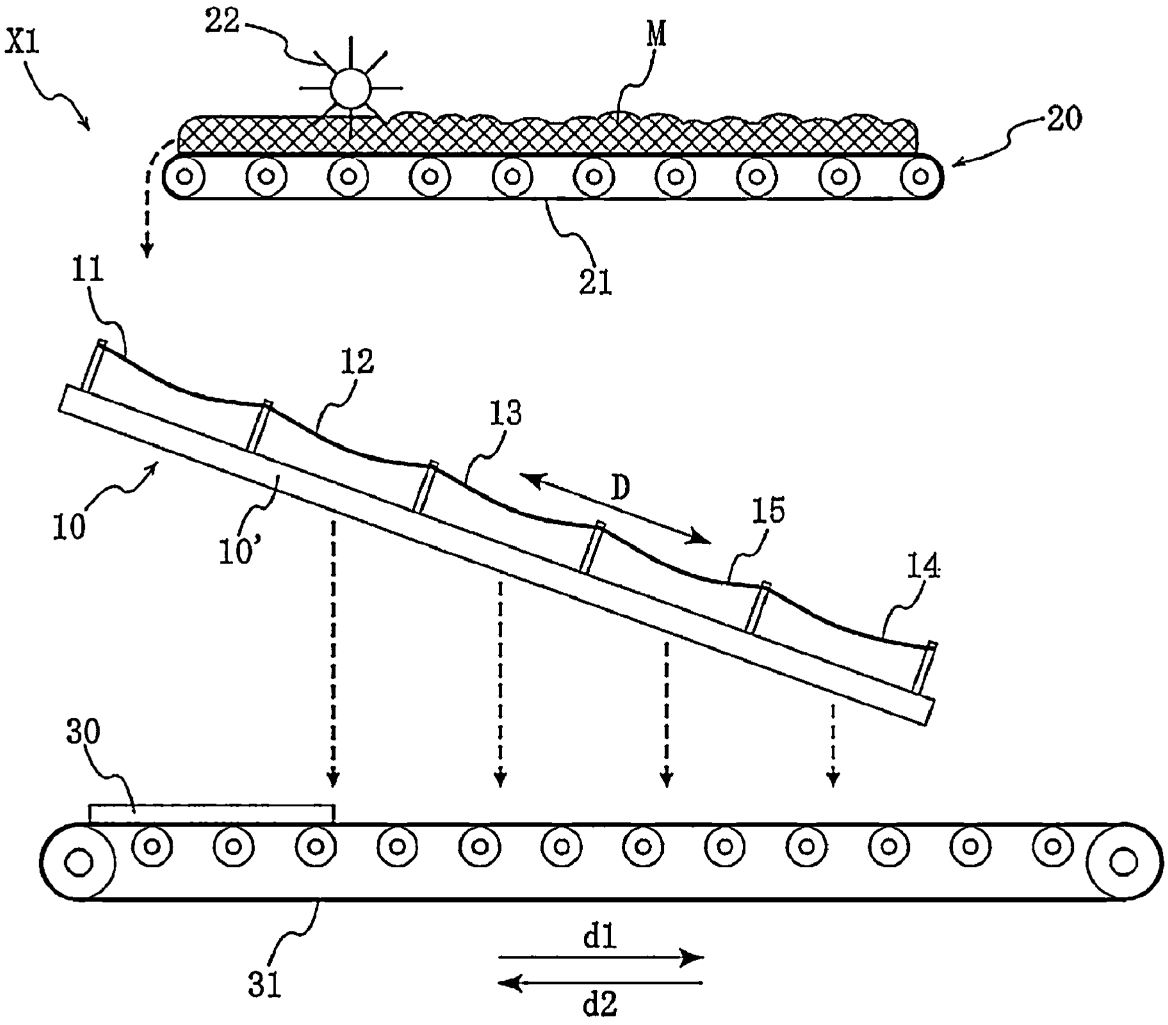
FIG. 1 is a schematic view of a building material manufacturing apparatus according to a first embodiment of the present invention.

FIG. 1 is a schematic view of a building material manufacturing apparatus X1 according to a first embodiment of the present invention. The building material manufacturing apparatus X1 includes a sieve portion 10, a raw material supply portion 20, and a receiver 30. The building material manufacturing apparatus X1 can form a building material mat, which is to become a building material after being subjected to a heat-pressing step, by depositing a building raw material having a predetermined size.

The sieve portion 10 includes a series of sheets that are each capable of performing a wave motion when the apparatus is operating, that have an inclination, and that are arranged in a direction of the inclination; and a body structure 10' to which the series of sheets are attached to realize the wave motion of each sheet. In the present embodiment, the wave motion of a sheet is a motion such that the sheet repeats vibration in the thickness direction thereof, and the speed of the wave motion increases as the period of the vibration decreases.

In the present embodiment, the series of sheets in the sieve portion 10 includes a receiving sheet 11, a sieve sheet 12 as a first sieve sheet, a sieve sheet 13 as a second sieve sheet, a sieve sheet 14 as a third sieve sheet, and a relay sheet 15. Each sheet is an elastic sheet having elasticity and, preferably, is a urethane rubber sheet. The thickness of the sheet is, for example, 2 to 5 mm. The inclination angle of the series of sheets in the sieve portion 10 is, for example, 6 to 25 degrees with respect to the horizontal.

Figure 2:
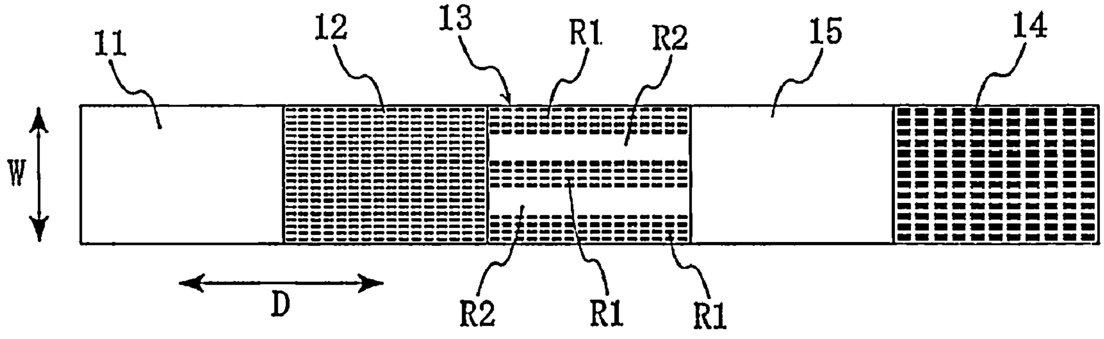
FIG. 2 illustrates the arrangement of sheets in the building material manufacturing apparatus illustrated in FIG. 1.

FIG. 2 illustrates the arrangement of the series of sheets in the present embodiment. In the series of sheets in the present embodiment, from the upper end thereof, the receiving sheet 11, the sieve sheet 12, the sieve sheet 13, the relay sheet 15, and the sieve sheet 14 are arranged in this order.

The receiving sheet 11 is positioned at the upper end of the series of sheets and receives a raw material that is dropped when the apparatus is operating. The receiving sheet 11 does not have any mesh. As illustrated in FIG. 1, the sieve sheet 12 is positioned below the receiving sheet 11, the sieve sheet 13 is positioned below the sieve sheet 12, the relay sheet 15 is positioned below the sieve sheet 13, and the sieve sheet 14 is positioned below the relay sheet 15. As illustrated in FIG. 2, the sieve sheets 12, 13, and 14 each have meshes.

In the sieve sheet 12, a plurality of meshes having an identical size are arranged at a regular pitch in the sheet width direction of the series of sheets. The size of each mesh of the sieve sheet 12, that is, the aperture size is, for example, 1 to 30 mm. In the present embodiment, the sheet width direction W is a direction perpendicular to the direction in which the series of sheets are arranged (sheet arrangement direction D).

The sieve sheet 13 has a mesh regions R1 and a non-mesh regions R2 that are arranged in the sheet width direction W. In the present embodiment, the sieve sheet 13 has a mesh region R1 at a part corresponding to a depression in an inner surface of the receiver 30 (described below), and has a non-mesh region R2 at a part corresponding to a protrusion on the inner surface of the receiver 30. In the mesh region R1, a plurality of meshes having an identical size are arranged at a regular pitch in the sheet width direction W. The size of each mesh of the mesh region R1 is larger than the size of each mesh of the sieve sheet 12. To be specific, the size of each mesh of the mesh region R1 of the sieve sheet 13, that is, the aperture size, is, for example, 10 to 40 mm, as long as the aperture size is larger than the size of each mesh of the sieve sheet 12. In contrast, the non-mesh region R2 does not have any mesh.

In the sieve sheet 14, a plurality of meshes having an identical size, which is larger than the size of each mesh of the sieve sheet 13, are arranged at a regular pitch in the sheet width direction W. The size of each mesh of the sieve sheet 14, that is, the aperture size, is, for example, 30 to 50 mm, as long as the aperture size is larger than the size of each mesh of the mesh region R1 of the sieve sheet 13.

The relay sheet 15 is a non-mesh sheet, as with the receiving sheet 11.

The body structure 10' of the sieve portion 10 includes an inner frame structure, an outer frame structure, and an eccentric vibrator.

The inner frame structure has a pair of inner side plates that extend parallelly, and a plurality of crossbeams (first crossbeams) that extend in the direction in which the inner side plates are separated and that bridge the gap between the inner side plates. Each first crossbeam has a sheet fixing portion at an upper end part thereof.

The outer frame structure has a pair of outer side plates that extend parallelly along the pair of inner side plates at positions outside of the inner side plates, and a plurality of crossbeams (second crossbeams) that extend in the direction in which the outer side plates are separated and that bridge the gap between the outer side plates. Each second crossbeam has a sheet fixing portion at an upper end part thereof.

The inner frame structure and the outer frame structure are arranged in such a way that the upper end parts of the first crossbeams (having the sheet fixing portions) of the inner frame structure and the upper end parts of the second crossbeams (having the sheet fixing portions) of the outer frame structure are alternately and parallelly arranged. The outer frame structure or the pair of outer side plates thereof are suspended by a support plate spring (not shown) with respect to the inner frame structure or the pair of inner side plates thereof. The inner frame structure is placed, in a state in which the outer frame structure is attached in this way, on a base (not shown) having a predetermined inclination via a cushion rubber (not shown).

The inner frame structure and the outer frame structure are connected to an eccentric vibrator (not shown), as a vibration source, via a drive plate spring (not shown). To be specific, the inner frame structure and the outer frame structure are coupled to the eccentric vibrator via the drive plate spring so that the inner frame structure and the outer frame structure can perform reciprocating motions having a phase difference of 180 degrees when the eccentric vibrator is rotationally driven. The rotational driving speed of the eccentric vibrator when the apparatus is operating is, for example, 500 to 600 revolutions per minute.

The aforementioned series of sheets of the sieve portion 10 are each fixed to the first and second crossbeams that are adjacent to each other. To be specific, one edge of each sheet in the sheet arrangement direction D is fixed to the sheet fixing portion of the first crossbeam, and the other edge of each sheet in the sheet arrangement direction D is fixed to the sheet fixing portion of the second crossbeam adjacent to the first crossbeam.

Examples of the body structure 10' of the sieve portion 10, that is, a mechanism that causes the series of sheets in the sieve portion 10 to perform wave motions include the body portion of a screener "Jumping Screen" (registered trademark) made by URAS TECHNO Co. Ltd.

The raw material supply portion 20, for supplying a raw material to the sieve portion 10 by dropping the building raw material M toward the receiving sheet 11 in the sieve portion 10, has a belt conveyor 21 and a leveling portion 22.

The belt conveyor 21 conveys the building raw material M to a position above the receiving sheet 11 of the sieve portion 10. The leveling portion 22 is a rotational structure for leveling the building raw material M conveyed on the belt conveyor 21, and has a plurality of leveling blades standing at the rotational peripheral end thereof. In the present embodiment, the leveling portion 22 is disposed in such a way that the rotational peripheral end of the leveling portion 22 faces the belt conveyor 21 and the rotation axis of the leveling portion 22 perpendicularly intersects the direction in which the belt conveyor 21 conveys the building raw material M.

In view of suppressing or avoiding increase in size of the building material manufacturing apparatus X1 and increase in scale of the entire facility including the building material manufacturing apparatus X1, preferably, the raw material supply portion 20 is disposed above the sieve portion 10 in such a way that the belt conveyor 21 extends along a horizontal component of the direction in which the series of sheets are arranged in the sieve portion 10.

In the present embodiment, the receiving sheet 11 of the aforementioned sieve portion 10 extends in a range that is the same as a drop region onto which the building raw material M is dropped from the raw material supply portion 20 or in a range beyond the drop region, in the sheet width direction W shown in FIG. 2 (a direction perpendicular to the sheet arrangement direction D).

Figure 3:
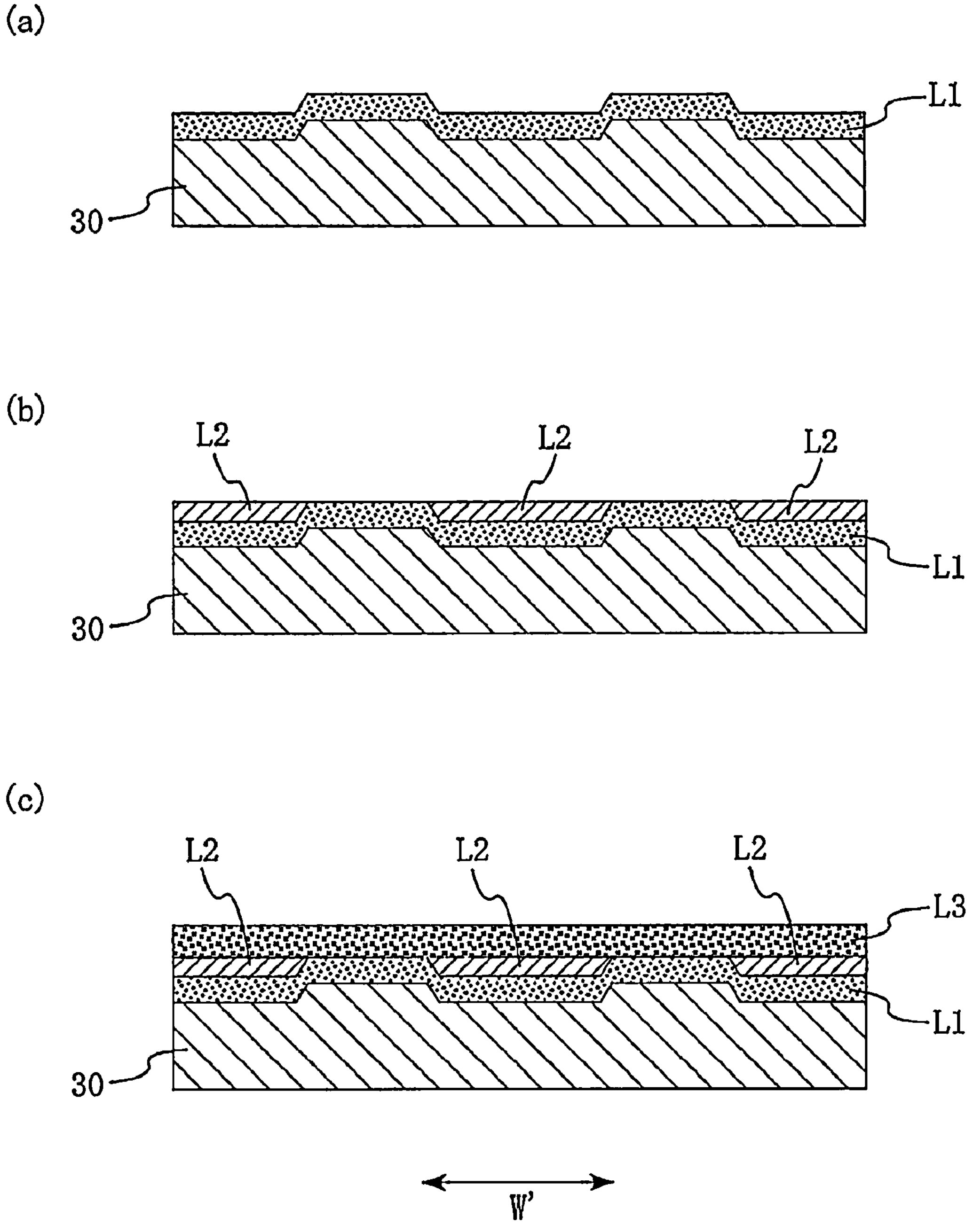
FIG. 3 shows sectional schematic views, in a receiver width direction, illustrating the manner in which a stack of layers in a mat are formed on a receiver of the building material manufacturing apparatus illustrated in FIG. 1.

The receiver 30, for receiving the building raw material M that has passed through the sieve portion 10, is placed on a belt conveyor 31 that forms a movement line of the receiver 30. The belt conveyor 31 extends along a horizontal component of the direction in which a series of sheets are arranged in the sieve portion 10. The receiver 30 is configured be movable under the series of sheets as the belt conveyor 31 operates. In the present embodiment, the receiver 30 is a template having a predetermined depression/protrusion pattern, corresponding to the design surface of a building material to be manufactured, on an inner surface thereof (a surface that receives the building raw material M). FIG. 3 illustrates a section of an example of the receiver 30 in a receiver width direction W' corresponding to the sheet width direction W.

When the building material manufacturing apparatus X1 is operating, the eccentric vibrator is rotationally driven in the body structure 10' of the sieve portion 10 to generate a reciprocating motion in each of the inner frame structure and the outer frame structure. As described above, the phase difference between the two reciprocating motions is 180 degrees. As the inner frame structure and the outer frame structure perform such reciprocating motions, in each sheet, a state in which the sheet is strongly stretched by the aforementioned first and second crossbeams and a state in which the sheet is loosened alternately occur, and the sheet performs a wave motion. The higher the rotational speed of the eccentric vibrator, the higher the speed of the wave motion of each sheet.

When the building material manufacturing apparatus X1 configured as described above is operating, the building raw material M is continuously supplied from a raw material storage portion (not shown) to the raw material supply portion 20. The building raw material M is prepared in accordance with a building material to be manufactured. When the building material to be manufactured is, for example, a fiber reinforced cement siding board, the building raw material M includes, for example, a hydraulic material and a reinforcement material, and may include a silica material, a hollow material, an admixture, a waterproofing agent, and the like.

Examples of hydraulic material include cement, gypsum, and slug. Examples of cement include ordinary Portland cement, high-early-strength Portland cement, alumina cement, blast furnace cement, and fly ash cement. Examples of the gypsum include gypsum anhydrite, gypsum hemihydrate, and gypsum dihydrate. Examples of slug include blast furnace slug and converter slug.

Examples of reinforcement material include plant-based reinforcement material and synthetic fiber. Examples of plant-based reinforcement material include wood flour, wood wool, wood chip, wood pulp, wood fiber, wood fiber bundle, waste paper, bamboo fiber, linen fiber, bagasse, chaff, and rice straw. Examples of synthetic fiber include polyester fiber, polyamide fiber, polyethylene fiber, polypropylene fiber, and acrylic fiber.

Examples of silica material include silica sand, silica brick powder, silica powder, coal ash, fly ash, and diatomaceous earth.

Examples of hollow material include foamed polystyrene beads, microsphere, perlite, fly ash balloon, Shirasu balloon, expanded shale, expanded clay, and burned diatomaceous earth. Examples of microsphere include acrylic foamed product.

Examples of admixture include mica, paper sludge incinerated ash, silica fume, wollastonite, calcium carbonate, magnesium hydroxide, aluminum hydroxide, vermiculite, sepiolite, xonotlite, kaolinite, and zeolite.

Examples of admixture further include pulverized product of inorganic board such as fiber reinforced cement siding board. Examples of pulverized product of inorganic board include pulverized product of defective pieces of unhardened inorganic board and pulverized product of defective pieces of hardened inorganic board, which are generated in the process of manufacturing inorganic board; and pulverized product of fragments and wastes of inorganic board generated at building sites and the like.

Examples of waterproofing agent include wax, paraffin, succinic acid, fatty acid, silicone, and synthetic resin. Examples of synthetic resin include acrylic resin, polyethylene, ethylene-vinyl acetate copolymer, urethane resin, and epoxy resin.

The building raw material M supplied to the raw material supply portion 20 of the building material manufacturing apparatus X1 is conveyed by the belt conveyor 21 to a position above the receiving sheet 11 of the sieve portion 10 at, for example, a constant speed. On the belt conveyor 21, the building raw material M is leveled by the leveling portion 22 that rotates or by the leveling blades of the leveling portion 22.

Then, when the building material manufacturing apparatus X1 is operating, in a state in which each of the series of sheets of the sieve portion 10 is performing a wave motion, the building raw material M is dropped from the raw material supply portion 20 toward the receiving sheet 11 of the sieve portion 10 (the raw material dropping path from the raw material supply portion 20 is shown by a broken-line arrow).

The building raw material M dropped from the raw material supply portion 20 includes portions having large cluster shapes. Such a building raw material M is received in the sieve portion 10 first by the receiving sheet 11, which does not have any mesh and which has a large raw material contact area. Such a configuration is suitable to pulverize the building raw material M having large cluster shapes by collision with the receiving sheet 11 that performs a wave motion, before reaching each sieve sheet of the sieve portion 10. The further the building raw material M is pulverized before reaching each sieve sheet of the sieve portion 10, blocking of each sieve sheet tends to be further suppressed.

In addition, the configuration such that the building raw material M dropped from the raw material supply portion 20 is received in the sieve portion 10 first by the receiving sheet 11, which does not have any mesh and which has a large raw material contact area, is suitable to disperse the building raw material M having large cluster shapes by collision with the receiving sheet 11 that performs a wave motion, before reaching each sieve sheet of the sieve portion 10. The further the building raw material M is dispersed before reaching each sieve sheet of the sieve portion 10, blocking of each sieve sheet tends to be further suppressed.

When the building material manufacturing apparatus X1 is operating, the building raw material M that has been pulverized and dispersed as described above by the receiving sheet 11 that performs a wave motion is screened by each sieve sheet in the process of moving downward on the series of sheets while being pulverized by collision with the other sheets each of which is in a state of performing a wave motion (screening). Then, of the building raw material M produced by being screened in the sieve portion 10, a part that has passed through the meshes of the sieve sheet 12, a part that has passed through the meshes of the sieve sheet 13, and a part that has passed through the meshes of the sieve sheet 14 are successively deposited on the receiver 30, and a raw material mat is formed (the raw material dropping paths from the sieve portion 10 are shown by broken-line arrows). The specifics are as follows.

First, the building raw material M that has passed through the meshes of the sieve sheet 12 is deposited on the receiver 30 that is conveyed by the belt conveyor 31 in the direction of an arrow d1 and passing directly below the sieve sheet 12 of the sieve portion 10.

In the sieve sheet 12, as described above, a plurality of meshes having an identical size are arranged at a regular pitch in the sheet width direction W. The building raw material M that has passed through the meshes of the sieve sheet 12 is deposited on the receiver 30 substantially uniformly. Thus, for example, as illustrated in FIG. 3(*a*), the layer L1 (first layer) whose thickness is substantially uniform in the receiver width direction W' corresponding to the sheet width direction W is formed on the receiver 30. The layer L1 is formed as the fine building raw material M that has passed through the meshes of the sieve sheet 12 (a part that has passed through the sieve sheet 12) is deposited.

Next, the building raw material M that has passed through the meshes of the sieve sheet 13 is deposited on the layer L1 on the receiver 30 that is conveyed by the belt conveyor 31 in the direction of the arrow d1 and passing directly below the sieve sheet 13 of the sieve portion 10.

At this time, for example, as illustrated in FIG. 3(*b*), while the layer L2 (second layer) is formed as the building raw material M is deposited on the layer L1 below the mesh region R1 of the sieve sheet 13, the building raw material M is not substantially deposited below the non-mesh region R2 of the sieve sheet 13. The layer L2 is formed as the building raw material M that has passed through the meshes of the mesh region R1 of the sieve sheet 13 (a part that has passed through the mesh region of the sieve sheet 13, which is coarser than a part that has passed through the sieve sheet 12) is deposited.

The building raw material M that has not passed through the meshes of the mesh region R1 of the sieve sheet 13 is pulverized and dispersed by colliding with the relay sheet 15, which does not have any mesh and which has a large raw material contact area, before reaching the sieve sheet 14. The further the building raw material M is pulverized and the further the building raw material M is dispersed before reaching the sieve sheet 14, blocking of the sieve sheet 14 tends to be further suppressed. Even when the building raw material M that does not pass through the meshes of the mesh region R1 of the sieve sheet 13 and moves downward on the sieve sheet 13 quantitatively varies in the sheet width direction W, the quantitative variation is reduced or eliminated in the process in which the building raw material M passes on the relay sheet 15.

Next, the building raw material M that has passed through the meshes of the sieve sheet 14 is deposited on the layers L1 and L2 on the receiver 30 that is conveyed by the belt conveyor 31 in the direction of the arrow d1 and passing directly below the sieve sheet 14 of the sieve portion 10.

In the sieve sheet 14, as described above, a plurality of meshes having an identical size, which is larger than the mesh of the sieve sheet 13, are arranged at a regular pitch in the sheet width direction W. The building raw material M that has passed through the meshes of the sieve sheet 14 is deposited substantially uniformly on the layers L1 and L2. Thus, for example, as illustrated in FIG. 3(*c*), a layer L3 (third layer) whose thickness is substantially uniform in the receiver width direction W' is formed on the layers L1 and L2. The layer L3 is formed as the building raw material M that has passed through the meshes of the sieve sheet 14 (coarser than a part that has passed through the mesh region of the sieve sheet 13) is deposited.

The raw material mat formed as described above includes the aforementioned layers L1, L2, and L3. That is, the building material manufacturing apparatus X1 can form a raw material mat having a three-layer structure by obtaining materials having three-segment particle-size distribution from the building raw material M through the aforementioned screening.

The layer L1 has high uniformity in thickness in the receiver width direction W' and is composed of a relatively fine building raw material M (a part that has passed through the sieve sheet 12). The layer L2 is an element that functions also as a building raw material deposit amount adjustment layer and is composed of a building raw material M that is coarser than a part that has passed through the sieve sheet 12. The layer L3 has high uniformity in thickness in the receiver width direction W' and is composed of a building raw material M that is coarser than a part that has passed through the mesh region of the sieve sheet 13. The raw material mat that has the layer L2, which functions also as a building raw material deposit amount adjustment layer, in addition to the layers L1 and L3 and that is formed on the receiver 30 is a raw material mat such that the building raw material deposit amount is varied in the receiver width direction W'.

Thus, the building material manufacturing apparatus X1 is suitable to form a raw material mat including the aforementioned layers L1, L2, and L3 while varying the building raw material deposit amount in the receiver width direction W'. The building material manufacturing apparatus X1 is suitable to vary, in the receiver width direction W', the building raw material deposit amount on the receiver 30, which receives the building raw material M under the sieve portion 10 that screens the building raw material M, while mechanically classifying the building raw material M.

The raw material mat formed in this way, that is, a stack of the layers L1, L2, and L3 is next subjected to a heat-pressing step. In the present step, the pressing pressure is, for example, 2 to 8 MPa; the heating temperature is, for example, 50 to 80° C.; and the pressing time is 6 to 12 hours. Subsequently, autoclave curing is performed as necessary. In the autoclave curing, the temperature condition is, for example, 150° C. or higher; and the pressure condition is, for example, 0.5 MPa or higher. Regarding these conditions in the heat-pressing step and the autoclave curing, the same applies to heat-pressing steps and autoclave curing described below.

The stack of the layers L1, L2, and L3 is subjected to the heat-pressing step or is subjected to the heat-pressing step and the subsequent autoclave curing, and thereby a building material having a staked structure including a hardened layer formed from the layer L1, a hardened layer formed from the layer L2, and a hardened layer formed from the layer L3 is manufactured. For example, in a case where a building material to be manufactured is a fiber reinforced cement siding board and the aforementioned building raw material M includes a hydraulic material, a silica material, and a reinforcement material, each hardened layer has a configuration such that the reinforcement material is dispersed in an inorganic hardened matrix formed from the hydraulic material and the silica material.

The hardened layer formed from the layer L1, which is a deposit of a relatively fine building raw material M, has a denser texture and thus is suitable to achieve high waterproof performance, and accordingly, is suitable to form a surface layer of a building material. Each of the hardened layers formed from the layers L2 and L3, each of which is a deposit of a relatively coarse building raw material M, has a sparser and lighter texture and thus is suitable to achieve high cushioning performance, and accordingly, is suitable to form a core layer of a building material.

By heat-pressing a raw material mat including the aforementioned layers L1, L2, and L3, it is possible to manufacture from the raw material mat a building material in which difference in density of texture between a part where a depression is formed in a building material design surface and a part where a protrusion is formed on the building material design surface is suppressed, that is, a building material having low nonuniformity in density. That is, the building material manufacturing apparatus X1 is suitable to manufacture a building material having a depression/protrusion pattern in a design surface thereof while suppressing nonuniformity in density. A building material having low nonuniformity in density is resistant to cracking and thus is preferable.

Figure 4:
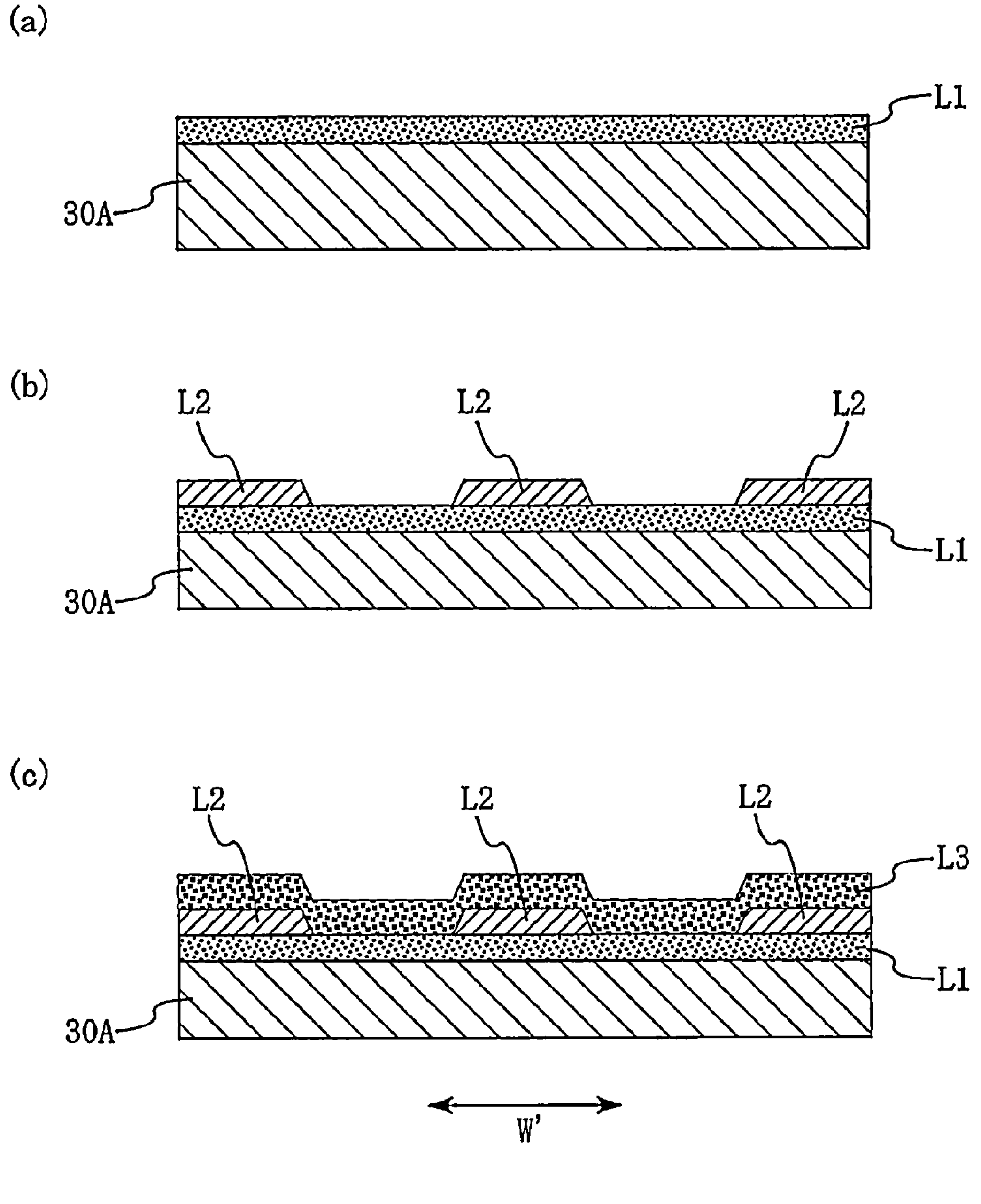
FIG. 4 shows sectional schematic views, in a receiver width direction, illustrating the manner in which a stack of layers in a mat are formed on a receiver in a modification of the building material manufacturing apparatus illustrated in FIG. 1.

FIG. 4 shows sectional schematic views in the receiver width direction illustrating the manner in which a stack of layers in a mat are formed on a receiver in a modification of the building material manufacturing apparatus X1. In the present modification, in forming a raw material mat by using the building material manufacturing apparatus X1, a receiver 30A is used instead of the aforementioned receiver 30. The receiver 30A is a template that does not have a protruding shape on an inner surface (a surface that receives the building raw material M) at at least at both end portions thereof in the receiver width direction W'. FIG. 4 illustrates a section in the width direction of an example of the receiver 30A. In the present modification, the raw material mat is formed in the following way.

First, the building raw material M that has passed through the meshes of the sieve sheet 12 is deposited on the receiver 30A that is conveyed by the belt conveyor 31 illustrated in FIG. 1 in the direction of the arrow d1 and passing directly below the sieve sheet 12 of the sieve portion 10.

In the sieve sheet 12, as described above, a plurality of meshes having an identical size are arranged at a regular pitch in the sheet width direction W. The building raw material M that has passed through the meshes of the sieve sheet 12 is deposited on the receiver 30A substantially uniformly. Thus, for example, as illustrated in FIG. 4(*a*), the layer L1 (first layer) whose thickness is substantially uniform in the receiver width direction W' corresponding to the sheet width direction W is formed on the receiver 30A. The layer L1 is formed as the fine building raw material M that has passed through the meshes of the sieve sheet 12 (a part that has passed through the sieve sheet 12) is deposited.

Next, the building raw material M that has passed through the meshes of the sieve sheet 13 is deposited on the layer L1 on the receiver 30A that is conveyed by the belt conveyor 31 in the direction of the arrow d1 and passing directly below the sieve sheet 13 of the sieve portion 10.

At this time, as illustrated in FIG. 4(*b*), while the layer L2 (second layer) is formed as the building raw material M is deposited on the layer L1 below the mesh region R1 of the sieve sheet 13, the building raw material M is not substantially deposited below the non-mesh region R2 of the sieve sheet 13. The layer L2 is formed as the building raw material M that has passed through the meshes of the mesh region R1 of the sieve sheet 13 (a part that has passed through the mesh region of the sieve sheet 13, which is coarser than a part that has passed through the sieve sheet 12) is deposited.

Next, a part of the building raw material M that has been pulverized and dispersed as described above on the relay sheet 15 and reached the sieve sheet 14 and that has passed through the meshes of the sieve sheet 14 is deposited on the layers L1 and L2 on the receiver 30A that is conveyed by the belt conveyor 31 in the direction of the arrow d1 and passing directly below the sieve sheet 14 of the sieve portion 10.

In the sieve sheet 14, as described above, a plurality of meshes having an identical size, which is larger than the mesh of the sieve sheet 13, are arranged at a regular pitch in the sheet width direction W. The building raw material M that has passed through the meshes of the sieve sheet 14 is deposited substantially uniformly on the layers L1 and L2. Thus, as illustrated in FIG. 4(*c*), a layer L3 (third layer) whose thickness is substantially uniform in the receiver width direction W' is formed on the layers L1 and L2. The layer L3 is formed as the building raw material M that has passed through the meshes of the sieve sheet 14 (coarser than a part that has passed through the mesh region of the sieve sheet 13) is deposited.

The raw material mat formed as described above includes the aforementioned layers L1, L2, and L3. The layer L1 has high uniformity in thickness in the receiver width direction W' and is composed of a relatively fine building raw material M (a part that has passed through the sieve sheet 12). The layer L2 is an element that functions also as a building raw material deposit amount adjustment layer and is composed of a building raw material M that is coarser than a part that has passed through the sieve sheet 12. The layer L3 has high uniformity in thickness in the receiver width direction W' and is composed of a building raw material M that is coarser than a part that has passed through the mesh region of the sieve sheet 13. The raw material mat that has the layer L2, which functions also as a building raw material deposit amount adjustment layer, in addition to the layers L1 and L2 and that is formed on the receiver 30A is a raw material mat such that the building raw material deposit amount is varied in the receiver width direction W'.

By heat-pressing a raw material mat including the layers L1, L2, and L3, it is possible to manufacture from the raw material mat a building material that has end portions having sufficient thickness and high density at both ends thereof in the receiver width direction W'. That is, the building material manufacturing apparatus X1 is also suitable to manufacture a building material having end portions that have sufficient thickness and high density at both ends thereof in the receiver width direction W'. Forming end portions of a building material to have high density is suitable to achieve high strength and high waterproof performance in the building material.

In forming the raw material mat by using the building material manufacturing apparatus X1, after forming the aforementioned layer L3, layers composed of the building raw material M may be further stacked on the receiver 30 while conveying the receiver 30 under the sieve portion 10 in the arrow d2 direction from the right end in the figure toward the left end in the figure by using the belt conveyor 31. In this case, a plurality of layers formed on the receiver 30 while conveying the receiver 30 in the direction of the arrow d1 are further stacked in an order opposite to staked order thereof. As a result, a raw material mat having a stack configuration that is symmetric in the thickness direction is formed. Also regarding building material manufacturing apparatuses described below, it is possible to form a raw material mat having a stack configuration that is symmetric in the thickness direction by reciprocating the receiver under the sieve portion in this way.

In the building material manufacturing apparatus X1, as described above, the receiving sheet 11 extends in a range that is the same as a drop region onto which the building raw material M is dropped from the raw material supply portion 20 or in a range beyond the drop region, in the sheet width direction W.

Such a configuration is preferable in order to appropriately receive all of the building raw material M supplied from the raw material supply portion 20 by using the sieve portion 10 or the receiving sheet 11 of the sieve portion 10. The configuration such that the width of the receiving sheet 11 is larger than that of the raw material dropping region is suitable to disperse the building raw material M having large cluster shapes by collision with the receiving sheet 11 that performs a wave motion, before reaching each sieve sheet of the sieve portion 10. The further the building raw material M is dispersed before reaching each sieve sheet of the sieve portion 10, blocking of each sieve sheet tends to be further suppressed.

In the building material manufacturing apparatus X1, as described above, the raw material supply portion 20 has the belt conveyor 21 for conveying the building raw material M to a position above the receiving sheet 11 of the sieve portion 10, and the leveling portion 22 for leveling the building raw material M conveyed on the belt conveyor 21.

Such a configuration is preferable in suppressing blocking of the sieve sheet 12 of the sieve portion 10. To be specific, leveling by the leveling portion 22 on the building raw material M conveyed on the belt conveyor 21 of the raw material supply portion 20 is suitable to uniformize the supply flow rate of the building raw material M that is supplied by being dropped from the terminal end of the belt conveyor 21 toward the receiving sheet 11, and accordingly, is preferable in suppressing nonuniformity of the building raw material M on the series of sheets in the sieve portion 10 and in suppressing blocking of each sieve sheet.

Figure 5:
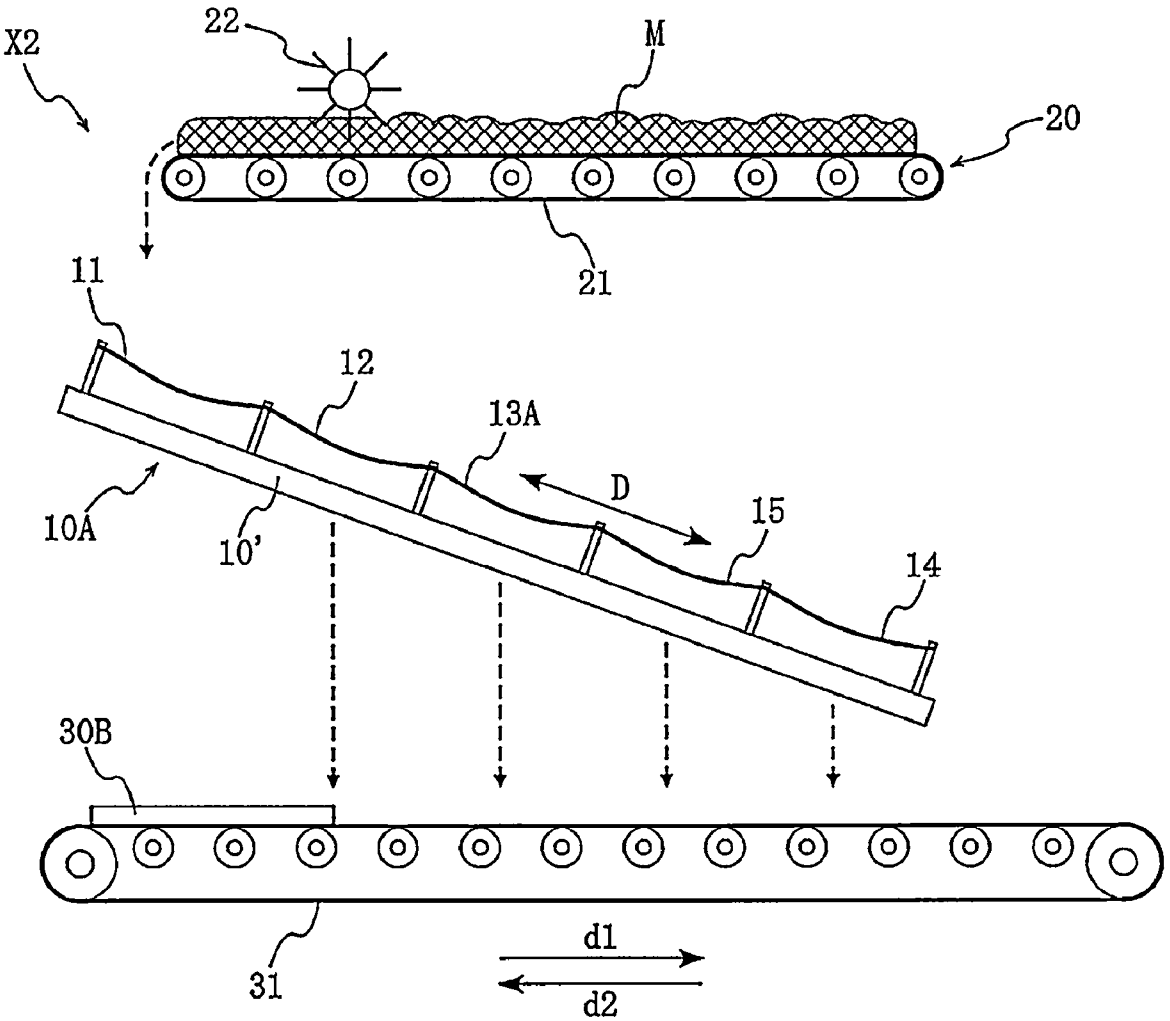
FIG. 5 is a schematic view of a building material manufacturing apparatus according to a second embodiment of the present invention.

FIG. 5 is a schematic view of a building material manufacturing apparatus X2 according to a second embodiment of the present invention. The building material manufacturing apparatus X2 includes a sieve portion 10A, the aforementioned raw material supply portion 20, and a receiver 30B. The building material manufacturing apparatus X2 differs from the building material manufacturing apparatus X1 according to the first embodiment in that the building material manufacturing apparatus X2 includes the sieve portion 10A and the receiver 30B instead of the sieve portion 10 and the receiver 30.

Figure 6:
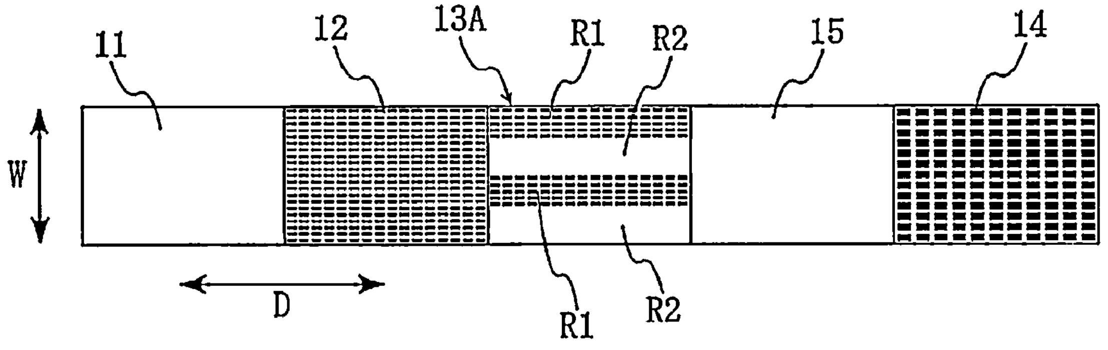
FIG. 6 illustrates the arrangement of sheets in the building material manufacturing apparatus illustrated in FIG. 5.

The sieve portion 10A includes: a series of sheets that are each capable of performing a wave motion when the apparatus is operating, that have an inclination, and that are arranged in a direction of the inclination; and the aforementioned body structure 10' to which the series of sheets are attached to realize the wave motion of each sheet. The sieve portion 10A differs from the sieve portion 10 in that the series of sheets include a sieve sheet 13A illustrated in FIG. 6, instead of the aforementioned sieve sheet 13. The other configurations of the sieve portion 10A are similar to those of the aforementioned sieve portion 10.

The sieve sheet 13A has a mesh regions R1 and a non-mesh regions R2 that are arranged in the sheet width direction W. In the mesh region R1 of the sieve sheet 13A, a plurality of meshes having two or more different sizes are arranged in the sheet width direction W. In the present embodiment, the mesh region R1 of the sieve sheet 13A has, in the sheet width direction W, a mesh pattern such that the size of a mesh corresponding to a deeper depression in the inner surface of the receiver 30B (described below) is larger. Each mesh of the mesh region R1 of the sieve sheet 13A has a size that is larger than or equal to that of each mesh of the sieve sheet 12. To be specific, the size of each mesh of the mesh region R1 of the sieve sheet 13A, that is, the aperture size, is, for example, 10 to 40 mm, as long as the aperture size is larger than the size of each mesh of the sieve sheet 12. In contrast, the non-mesh region R2 of the sieve sheet 13A does not have any mesh.

Figure 7:
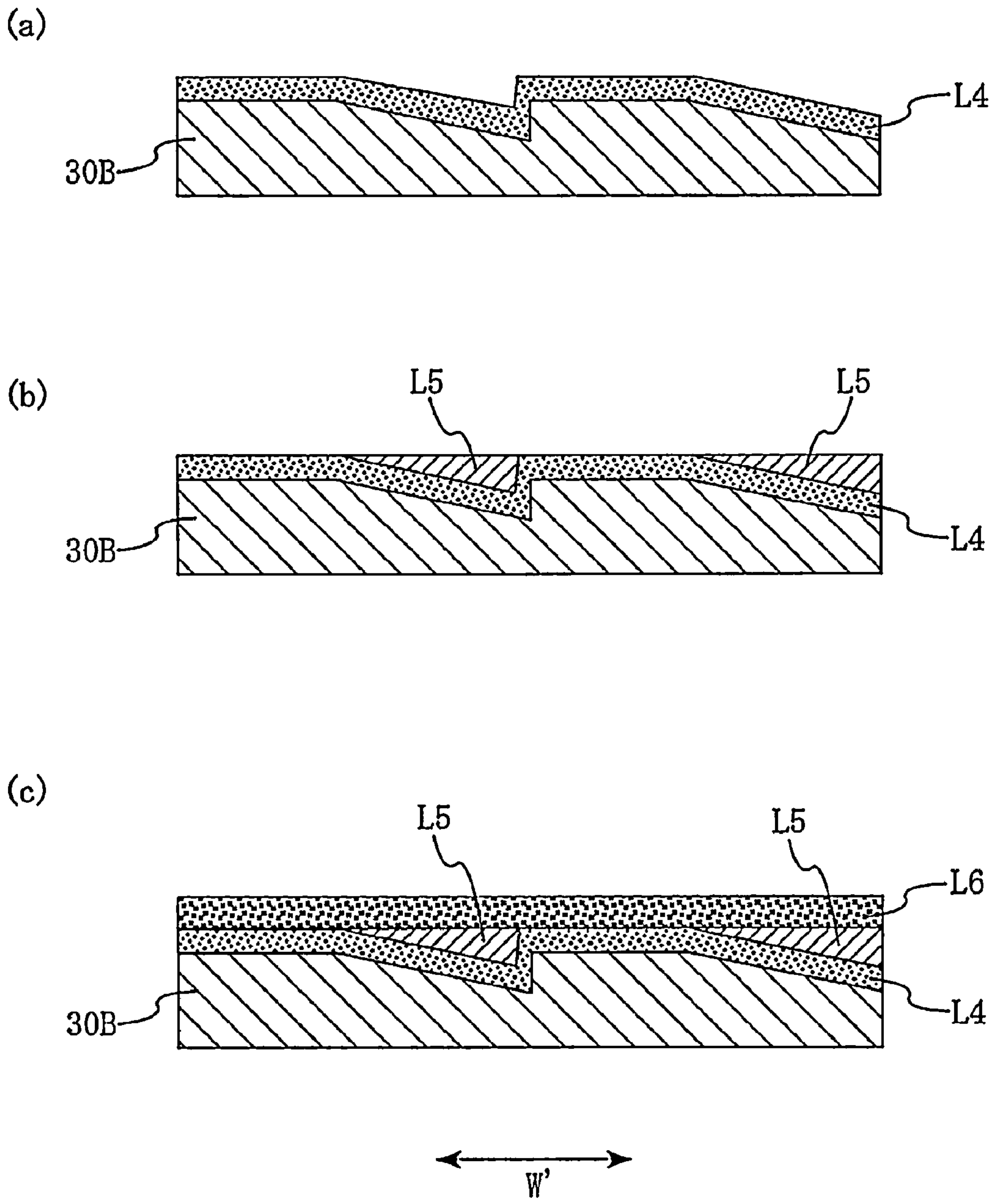
FIG. 7 shows sectional schematic views, in a receiver width direction, illustrating the manner in which a stack of layers in a mat are formed on a receiver of the building material manufacturing apparatus illustrated in FIG. 5.

In the present embodiment, the receiver 30B is a template having a predetermined depression/protrusion pattern, corresponding to the design surface of a building material to be manufactured, on an inner surface thereof (a surface that receives the building raw material M). FIG. 7 illustrates a section of an example of the receiver 30B in a receiver width direction W' corresponding to the sheet width direction W. The other configurations of the receiver 30B are similar to those of the aforementioned receiver 30.

When the building material manufacturing apparatus X2 configured as described above is operating, the building raw material M is continuously supplied from a raw material storage portion (not shown) to the raw material supply portion 20. The building raw material M is conveyed by the belt conveyor 21 to a position above the receiving sheet 11 of the sieve portion 10A at, for example, a constant speed. On the belt conveyor 21, the building raw material M is leveled by the leveling portion 22 that rotates or by the leveling blades of the leveling portion 22.

Then, in a state in which each of the series of sheets of the sieve portion 10A is performing a wave motion, the building raw material M is dropped from the raw material supply portion 20 toward the receiving sheet 11 of the sieve portion 10A (the raw material dropping path from the raw material supply portion 20 is shown by a broken-line arrow).

The building raw material M supplied from the raw material supply portion 20 is pulverized and dispersed by the receiving sheet 11 that performs a wave motion in the same way as described above regarding the building material manufacturing apparatus X1. Thus, blocking of each sieve sheet of the sieve portion 10A tends to be suppressed.

When the building material manufacturing apparatus X2 is operating, the building raw material M that has been pulverized and dispersed by the receiving sheet 11 that performs a wave motion is screened by each sieve sheet in the process of moving downward on the series of sheets while being pulverized by collision with the other sheets each of which is in a state of performing a wave motion. Then, of the building raw material M produced by being screened in the sieve portion 10A, a part that has passed through the meshes of the sieve sheet 12, a part that has passed through the meshes of the sieve sheet 13A, and a part that has passed through the meshes of the sieve sheet 14 are successively deposited on the receiver 30B and a raw material mat is formed (the raw material dropping paths from the sieve portion 10A are shown by broken-line arrows). The specifics are as follows.

First, the building raw material M that has passed through the meshes of the sieve sheet 12 is deposited on the receiver 30B that is conveyed by the belt conveyor 31 in the direction of the arrow d1 and passing directly below the sieve sheet 12 of the sieve portion 10.

In the sieve sheet 12, as described above, a plurality of meshes having an identical size are arranged at a regular pitch in the sheet width direction W. The building raw material M that has passed through the meshes of the sieve sheet 12 is deposited on the receiver 30B substantially uniformly. Thus, for example, as illustrated in FIG. 7(*a*), the layer L4 (first layer) whose thickness is substantially uniform in the receiver width direction W' corresponding to the sheet width direction W is formed on the receiver 30B. The layer L4 is formed as the fine building raw material M that has passed through the meshes of the sieve sheet 12 (a part that has passed through the sieve sheet 12) is deposited.

Next, the building raw material M that has passed through the meshes of the sieve sheet 13A is deposited on the layer L4 on the receiver 30B that is conveyed by the belt conveyor 31 in the direction of the arrow d1 and passing directly below the sieve sheet 13A of the sieve portion 10A.

At this time, for example, as illustrated in FIG. 7(*b*), while the layer L5 (second layer) is formed as the building raw material M is deposited on the layer L4 below the mesh region R1 of the sieve sheet 13A, the building raw material M is not substantially deposited below the non-mesh region R2 of the sieve sheet 13A. In the layer L5, the deposit amount of the building raw material M tends to be larger in a part corresponding to a deeper depression in the inner surface of the receiver 30B. The layer L5 is formed as the building raw material M that has passed through the meshes of the mesh region R1 of the sieve sheet 13A (a part that has passed through the mesh region of the sieve sheet 13A, which is coarser than a part that has passed through the sieve sheet 12) is deposited.

The building raw material M that has not passed through the meshes of the mesh region R1 of the sieve sheet 13A is pulverized and dispersed by colliding with the relay sheet 15, which does not have any mesh and which has a large raw material contact area, before reaching the sieve sheet 14. The further the building raw material M is pulverized and the further the building raw material M is dispersed before reaching the sieve sheet 14, blocking of the sieve sheet 14 tends to be further suppressed. Even when the building raw material M that does not pass through the meshes of the mesh region R1 of the sieve sheet 13A and moves downward on the sieve sheet 13A quantitatively varies in the sheet width direction W, the quantitative variation is reduced or eliminated in the process in which the building raw material M passes on the relay sheet 15.

Next, the building raw material M that has passed through the meshes of the sieve sheet 14 is deposited on the layers L4 and L5 on the receiver 30B that is conveyed by the belt conveyor 31 in the direction of the arrow d1 and passing directly below the sieve sheet 14 of the sieve portion 10A.

In the sieve sheet 14, a plurality of meshes having an identical size, which is larger than the mesh of the sieve sheet 13A, are arranged at a regular pitch in the sheet width direction W. The building raw material M that has passed through the meshes of the sieve sheet 14 is deposited substantially uniformly on the layers L4 and L5. Thus, for example, as illustrated in FIG. 7(*c*), a layer L6 (third layer) whose thickness is substantially uniform in the receiver width direction W' is formed on the layers L4 and L5. The layer L6 is formed as the building raw material M that has passed through the meshes of the sieve sheet 14 (coarser than a part that has passed through the sieve sheet 13A) is deposited.

The raw material mat formed as described above includes the aforementioned layers L4, L5, and L6. The layer L4 has high uniformity in thickness in the receiver width direction W' and is composed of a relatively fine building raw material M (a part that has passed through the sieve sheet 12). The layer L5 is an element that functions also as a building raw material deposit amount adjustment layer and is composed of a building raw material M that is coarser than a part that has passed through the sieve sheet 12. The layer L6 has high uniformity in thickness in the receiver width direction W' and is composed of a building raw material M that is coarser than a part that has passed through the sieve sheet 13A. The raw material mat that has the layer L5, which functions also as a building raw material deposit amount adjustment layer, in addition to the layers L4 and L6 and that is formed on the receiver 30B is a raw material mat such that the building raw material deposit amount is varied in the receiver width direction W'.

Thus, the building material manufacturing apparatus X2 is suitable to form a raw material mat including the aforementioned layers L4, L5, and L6 while varying the building raw material deposit amount in the receiver width direction W'. The building material manufacturing apparatus X2 is suitable to vary, in the receiver width direction W', the building raw material deposit amount on the receiver 30B, which receives the building raw material M under the sieve portion 10A that screens the building raw material M, while mechanically classifying the building raw material M.

The raw material mat formed in this way, that is, a stack of the layers L4, L5, and L6 is next subjected to a heat-pressing step. The stack of the layers L4, L5, and L6 is subjected to the heat-pressing step or is subjected to the heat-pressing step and the subsequent autoclave curing, and thereby a building material having a staked structure of hardened layers formed from the layers is manufactured.

The hardened layer formed from the layer L4, which is a deposit of a relatively fine building raw material M, has a denser texture and thus is suitable to achieve high waterproof performance, and accordingly, is suitable to form a surface layer of a building material. Each of the hardened layers formed from the layers L5 and L6, each of which is a deposit of a relatively coarse building raw material M, has a sparser and lighter texture and thus is suitable to achieve high cushioning performance, and accordingly, is suitable to form a core layer of a building material.

By heat-pressing a raw material mat including the aforementioned layers L4, L5, and L6, it is possible to manufacture from the raw material mat a building material in which difference in density of texture between a part where a depression is formed in a building material design surface and a part where a protrusion is formed on the building material design surface is suppressed, that is, a building material having low nonuniformity in density. That is, the building material manufacturing apparatus X2 is suitable to manufacture a building material having a depression/protrusion pattern in a design surface thereof while suppressing nonuniformity in density.

Figure 8:
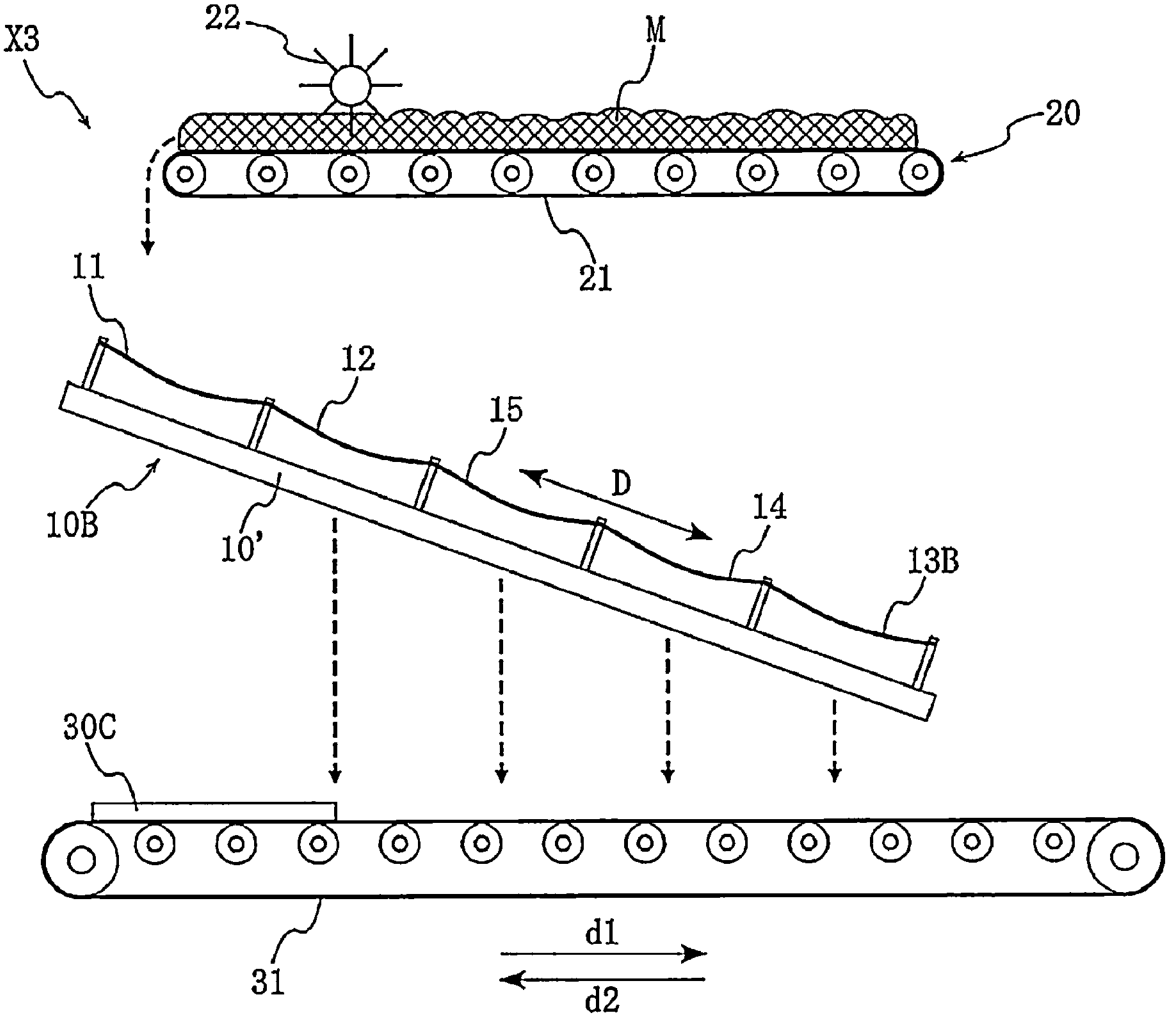
FIG. 8 is a schematic view of a building material manufacturing apparatus according to a third embodiment of the present invention.

FIG. 8 is a schematic view of a building material manufacturing apparatus X3 according to a third embodiment of the present invention. The building material manufacturing apparatus X3 includes a sieve portion 10B, the aforementioned raw material supply portion 20, and a receiver 30C. The building material manufacturing apparatus X3 differs from the building material manufacturing apparatus X1 according to the first embodiment in that the building material manufacturing apparatus X3 includes the sieve portion 10B and the receiver 30C instead of the sieve portion 10 and the receiver 30.

The sieve portion 10B includes: a series of sheets that are each capable of performing a wave motion when the apparatus is operating, that have an inclination, and that are arranged in a direction of the inclination; and the aforementioned body structure 10' to which the series of sheets are attached to realize the wave motion of each sheet.

Figure 9:
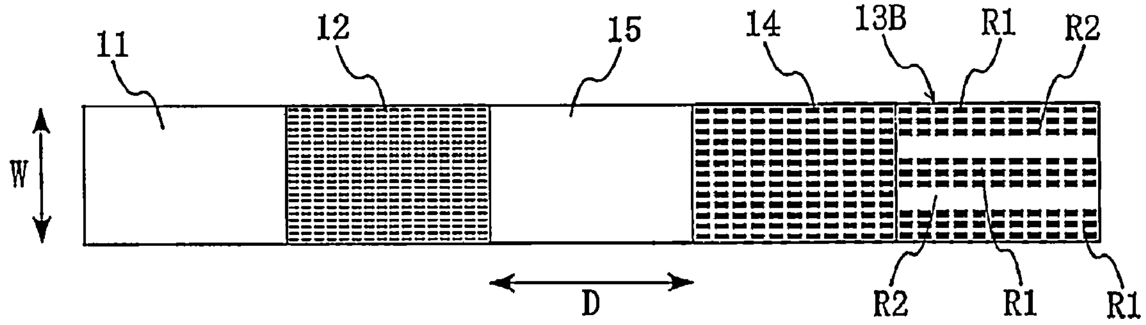
FIG. 9 illustrates the arrangement of sheets in the building material manufacturing apparatus illustrated in FIG. 8.

The sieve portion 10B differs from the sieve portion 10 in that the sieve portion 10B has a series of sheets arranged as illustrated in FIG. 9, instead of a series of sheets arranged as described above with reference to FIG. 2. The other configurations of the sieve portion 10B are similar to those of the aforementioned sieve portion 10.

In a series of sheets of the sieve portion 10B, from the upper end thereof, the aforementioned receiving sheet 11 having no mesh, the aforementioned fine-mesh sieve sheet 12 (first sieve sheet), the relay sheet 15, the aforementioned coarse-mesh sieve sheet 14 (third sieve sheet), and a sieve sheet 13B (second sieve sheet) are arranged in this order. The sieve sheet 14, which is a third sieve sheet, is positioned between the sieve sheet 12, which is a first sieve sheet, and the sieve sheet 13B, which is a second sieve sheet.

The sieve sheet 13B has a mesh regions R1 and a non-mesh regions R2 that are arranged in the sheet width direction W. In the present embodiment, the sieve sheet 13B has a mesh region R1 at a part corresponding to a depression in an inner surface of the receiver 30, and has a non-mesh region R2 at a part corresponding to a protrusion on the inner surface of the receiver 30. The meshes in the mesh region R1 each have a size that is larger than or equal to the size of each mesh of the sieve sheet 14. To be specific, the size of each mesh of the mesh region R1 of the sieve sheet 13B, that is, the aperture size, is, for example, 30 to 60 mm, as long as the aperture size is larger than the size of each mesh of the sieve sheets 12 and 14. In contrast, the non-mesh region R2 does not have any mesh.

The relay sheet 15 is a non-mesh sheet, as with the receiving sheet 11, and is positioned between the fine-mesh sieve sheet 12 and the coarse-mesh sieve sheet 14.

Figure 10:
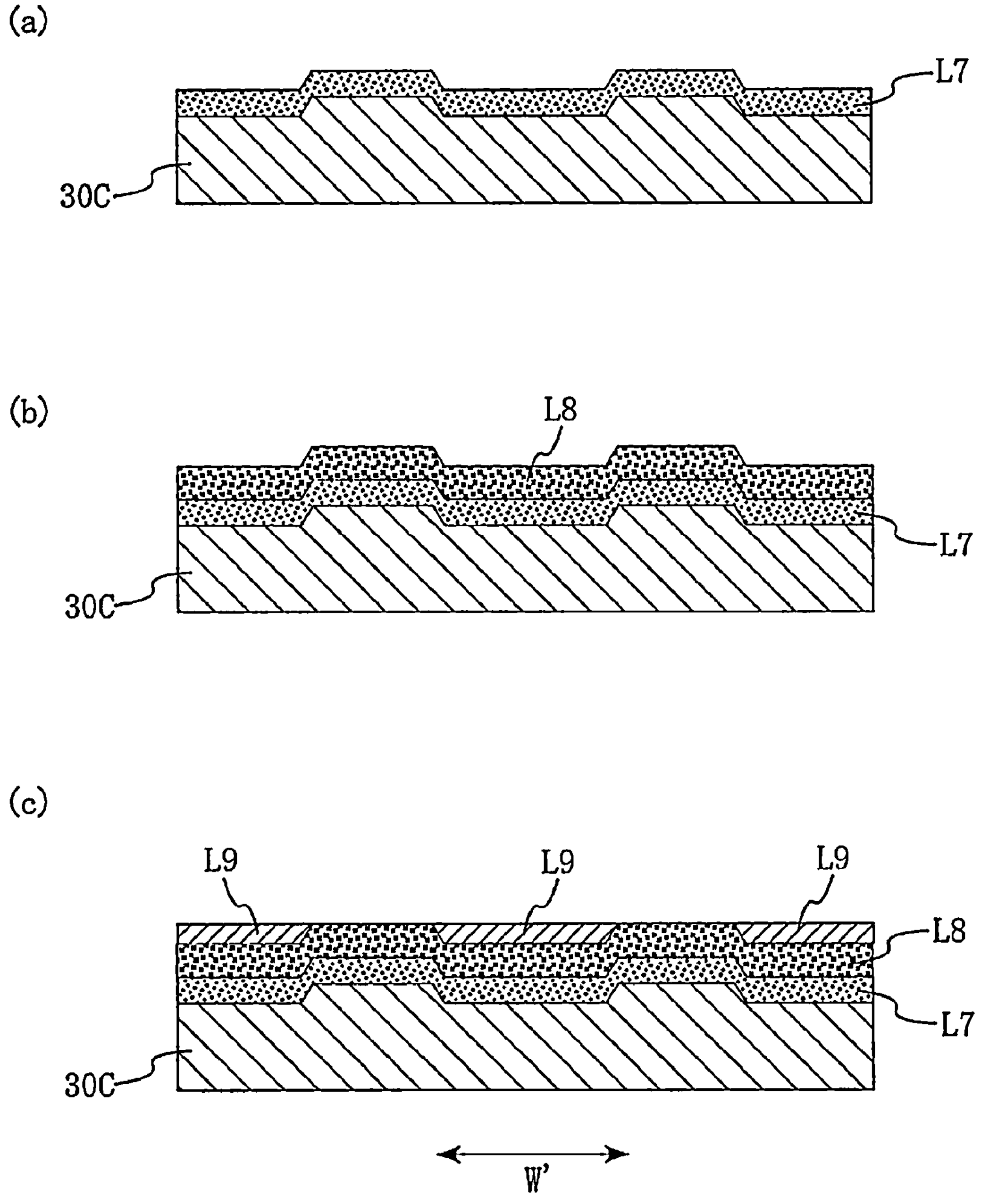
FIG. 10 shows sectional schematic views, in a receiver width direction, illustrating the manner in which a stack of layers in a mat are formed on a receiver of the building material manufacturing apparatus illustrated in FIG. 8.

In the present embodiment, the receiver 30C is a template having a predetermined depression/protrusion pattern, corresponding to the design surface of a building material to be manufactured, on an inner surface thereof (a surface that receives the building raw material M). FIG. 10 illustrates a section of an example of the receiver 30C in a receiver width direction W'. The other configurations of the receiver 30C are the same as those of the aforementioned receiver 30.

When the building material manufacturing apparatus X3 configured as described above is operating, the building raw material M is continuously supplied from a raw material storage portion (not shown) to the raw material supply portion 20. The building raw material M is conveyed by the belt conveyor 21 to a position above the receiving sheet 11 of the sieve portion 10B at, for example, a constant speed. On the belt conveyor 21, the building raw material M is leveled by the leveling portion 22 that rotates or by the leveling blades of the leveling portion 22.

Then, in a state in which each of the series of sheets of the sieve portion 10B is performing a wave motion, the building raw material M is dropped from the raw material supply portion 20 toward the receiving sheet 11 of the sieve portion 10B (the raw material dropping path from the raw material supply portion 20 is shown by a broken-line arrow).

The building raw material M supplied from the raw material supply portion 20 is pulverized and dispersed by the receiving sheet 11 that performs a wave motion, as in the building material manufacturing apparatus X1. Thus, blocking of each sieve sheet of the sieve portion 10B tends to be suppressed.

When the building material manufacturing apparatus X3 is operating, the building raw material M that has been pulverized and dispersed by the receiving sheet 11 that performs a wave motion is screened by each sieve sheet in the process of moving downward on the series of sheets while being pulverized by collision with the other sheets each of which is in a state of performing a wave motion. Then, of the building raw material M produced by being screened in the sieve portion 10B, a part that has passed through the meshes of the sieve sheet 12, a part that has passed through the meshes of the sieve sheet 14, and a part that has passed through the meshes of the sieve sheet 13B are successively deposited on the receiver 30C and a raw material mat is formed (the raw material dropping paths from the sieve portion 10B are shown by broken-line arrows). The specifics are as follows.

First, the building raw material M that has passed through the meshes of the sieve sheet 12 is deposited on the receiver 30C that is conveyed by the belt conveyor 31 in the direction of the arrow d1 and passing directly below the sieve sheet 12 of the sieve portion 10.

In the sieve sheet 12, as described above, a plurality of meshes having an identical size are arranged at a regular pitch in the sheet width direction W. The building raw material M that has passed through the meshes of the sieve sheet 12 is deposited on the receiver 30C substantially uniformly. Thus, for example, as illustrated in FIG. 10(*a*), the layer L7 (first layer) whose thickness is substantially uniform in the receiver width direction W' corresponding to the sheet width direction W is formed on the receiver 30C. The layer L7 is formed as the fine building raw material M that has passed through the meshes of the sieve sheet 12 is deposited.

The building raw material M that has not passed through the meshes of the sieve sheet 12 is pulverized and dispersed by colliding with the relay sheet 15, which does not have any mesh and which has a large raw material contact area, before reaching the sieve sheet 14. The further the building raw material M is pulverized and the further the building raw material M is dispersed before reaching the sieve sheet 14, blocking of the sieve sheet 14 and the sieve sheet 13B below the sieve sheet 14 tends to be further suppressed.

Next, the building raw material M that has passed through the meshes of the sieve sheet 14 is deposited on the layer L7 on the receiver 30C that is conveyed by the belt conveyor 31 in the direction of the arrow d1 and passing directly below the sieve sheet 14 of the sieve portion 10B.

In the sieve sheet 14, a plurality of meshes having an identical size, which is larger than the mesh of the sieve sheet 12, are arranged at a regular pitch in the sheet width direction W. The building raw material M that has passed through the meshes of the sieve sheet 14 is deposited substantially uniformly on the layer L7. Thus, for example, as illustrated in FIG. 10(*b*), a layer L8 (third layer) whose thickness is substantially uniform in the receiver width direction W' is formed on the layer L7. The layer L8 is formed as the building raw material M that has passed through the meshes of the sieve sheet 14 (a part that is coarser than a part that has passed through the mesh region of the sieve sheet 12, and that has passed through the sieve sheet 14) is deposited.

Next, the building raw material M that has passed through the meshes of the mesh region R1 of the sieve sheet 13B is deposited on the layer L8 on the receiver 30C that is conveyed by the belt conveyor 31 in the direction of the arrow d1 and passing directly below the sieve sheet 13B of the sieve portion 10B.

At this time, for example, as illustrated in FIG. 10(*c*), while the layer L9 (second layer) is formed as the building raw material M is deposited on the layer L8 below the mesh region R1 of the sieve sheet 13B, the building raw material M is not substantially deposited below the non-mesh region R2 of the sieve sheet 13B. The layer L9 is formed as the building raw material M that has passed through the meshes of the mesh region R1 of the sieve sheet 13B (coarser than a part that has passed through the sieve sheet 14) is deposited.

The raw material mat formed as described above includes the aforementioned layers L7, L8, and L9. The layer L7 has high uniformity in thickness in the receiver width direction W' and is composed of a relatively fine building raw material M (a part that has passed through the sieve sheet 12). The layer L8 has high uniformity in thickness in the receiver width direction W' and is composed of the building raw material M that is coarser than a part that has passed through the sieve sheet 12. The layer L9 is an element that functions also as a building raw material deposit amount adjustment layer and is composed of a building raw material M that is coarser than a part that has passed through the sieve sheet 14. The raw material mat that has the layer L9, which functions also as a building raw material deposit amount adjustment layer, in addition to the layers L7 and L8 and that is formed on the receiver 30C is a raw material mat such that the building raw material deposit amount is varied in the receiver width direction W'.

Thus, the building material manufacturing apparatus X3 is suitable to form a raw material mat including the aforementioned layers L7, L8, and L9 while varying the building raw material deposit amount in the receiver width direction W'. The building material manufacturing apparatus X3 is suitable to vary, in the receiver width direction W', the building raw material deposit amount on the receiver 30C, which receives the building raw material M under the sieve portion 10B that screens the building raw material M, while mechanically classifying the building raw material M.

The raw material mat formed in this way, that is, a stack of the layers L7, L8, and L9 is next subjected to a heat-pressing step. The stack of the layers L7, L8, and L9 is subjected to the heat-pressing step or is subjected to the heat-pressing step and the subsequent autoclave curing, and thereby a building material having a staked structure of hardened layers formed from the layers is manufactured.

The hardened layer formed from the layer L7, which is a deposit of a relatively fine building raw material M, has a denser texture and thus is suitable to achieve high waterproof performance, and accordingly, is suitable to form a surface layer of a building material. Each of the hardened layers formed from the layers L8 and L9, each of which is a deposit of a relatively coarse building raw material M, has a sparser and lighter texture and thus is suitable to achieve high cushioning performance, and accordingly, is suitable to form a core layer of a building material.

By heat-pressing a raw material mat including the aforementioned layers L7, L8, and L9, it is possible to manufacture from the raw material mat a building material in which difference in density of texture between a part where a depression is formed in a building material design surface and a part where a protrusion is formed on the building material design surface is suppressed, that is, a building material having low nonuniformity in density. That is, the building material manufacturing apparatus X3 is suitable to manufacture a building material having a depression/protrusion pattern in a design surface thereof while suppressing nonuniformity in density.

In the same way as the layers L1, L2, and L3 are formed on the receiver 30A (a template that does not have a protruding shape on a surface that receives the building raw material M) by using the receiver 30A instead of the receiver 30 in the building material manufacturing apparatus X1, the aforementioned layers L7, L8, and L9 may be formed on a receiver that is a template that does not have a protruding shape on a surface that receives the building raw material M by using the receiver instead of the aforementioned receiver 30C in the building material manufacturing apparatus X3. In this case, in the same way as described above regarding the modification in which the receiver 30A is used in the building material manufacturing apparatus X1, it is possible to manufacture a building material having end portions that have sufficient thickness and high density at both ends thereof in the receiver width direction W'.

Figure 11:
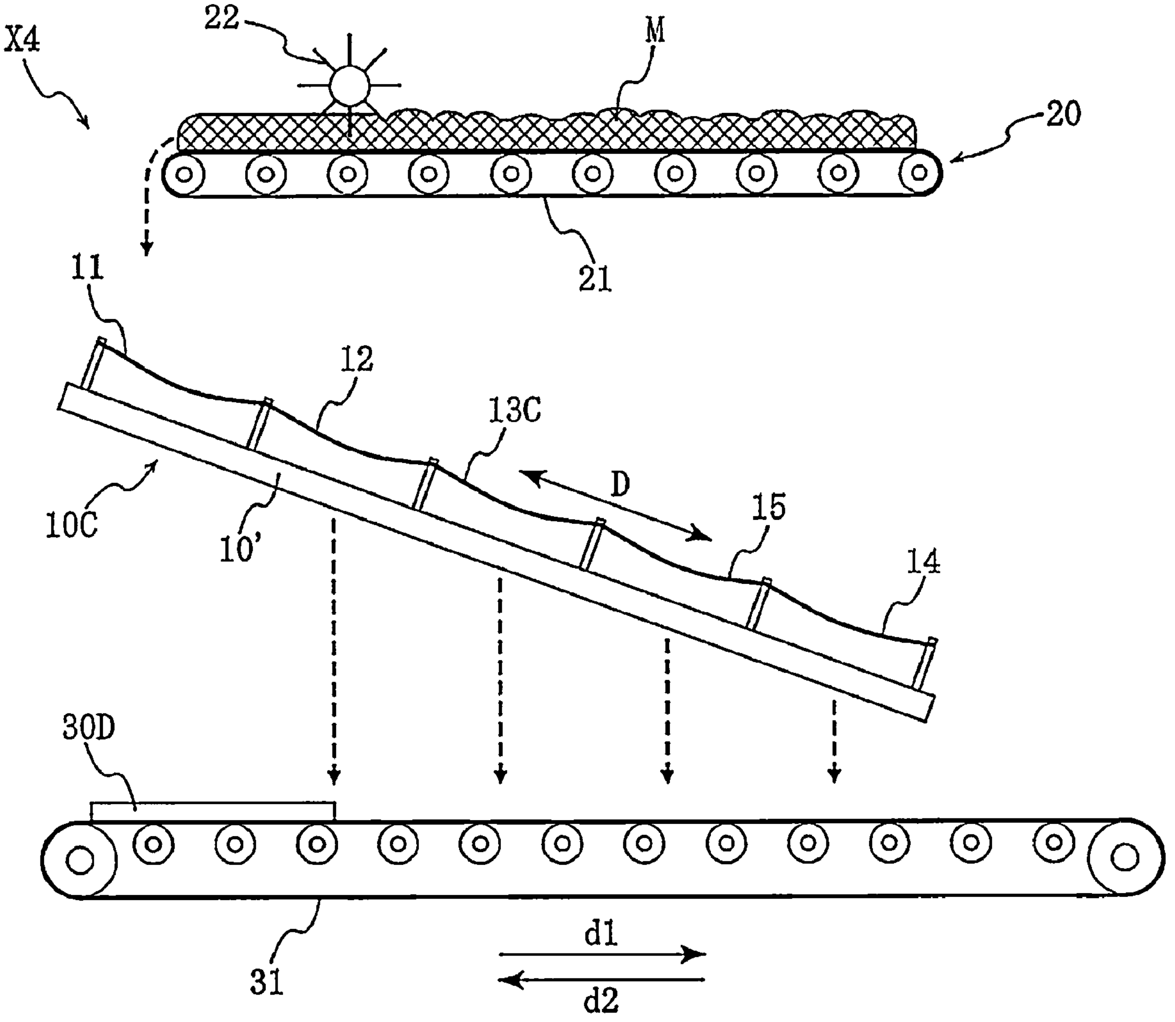
FIG. 11 is a schematic view of a building material manufacturing apparatus according to a fourth embodiment of the present invention.

FIG. 11 is a schematic view of a building material manufacturing apparatus X4 according to a fourth embodiment of the present invention. The building material manufacturing apparatus X4 includes a sieve portion 10C, the aforementioned raw material supply portion 20, and a receiver 30D. The building material manufacturing apparatus X4 differs from the building material manufacturing apparatus X1 according to the first embodiment in that the building material manufacturing apparatus X4 includes the sieve portion 10C and the receiver 30D instead of the sieve portion 10 and the receiver 30.

The sieve portion 10C includes: a series of sheets that are each capable of performing a wave motion when the apparatus is operating, that have an inclination, and that are arranged in a direction of the inclination; and the aforementioned body structure 10' to which the series of sheets are attached to realize the wave motion of each sheet.

Figure 12:
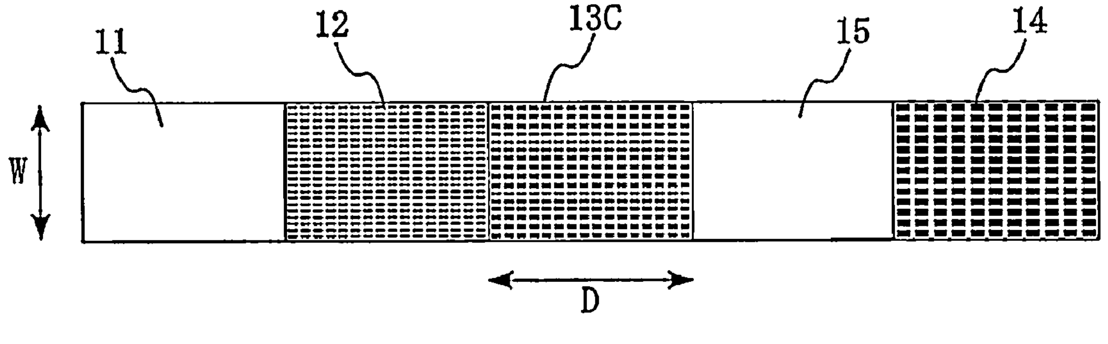
FIG. 12 illustrates the arrangement of sheets in the building material manufacturing apparatus illustrated in FIG. 11.

The sieve portion 10C differs from the sieve portion 10 in that the sieve portion 10C has a series of sheets arranged as illustrated in FIG. 12, instead a series of sheets arranged as described above with reference to FIG. 2. The other configurations of the sieve portion 10C are similar to those of the aforementioned sieve portion 10.

In the series of sheets of the sieve portion 10C, from the upper end thereof, the aforementioned receiving sheet 11 having no mesh, the sieve sheet 12 having a fine mesh (first sieve sheet), a sieve sheet 13C (second sieve sheet), the aforementioned relay sheet 15, and the aforementioned sieve sheet 14 (third sieve sheet) are arranged in this order. The sieve sheet 14, which is a third sieve sheet, is positioned below the sieve sheet 12, which is a first sieve sheet, and the sieve sheet 13C, which is a second sieve sheet.

In the sieve sheet 13C, a plurality of meshes having two or more different sizes are arranged in the sheet width direction W. In the present embodiment, a plurality of meshes that are relatively large (first mesh) are positioned at a part corresponding to a depression of the inner surface of the receiver 30D (described below), and a plurality of meshes that are relatively small (second mesh) are positioned at a part corresponding to a protrusion on the inner surface of the receiver 30D. Each mesh of the sieve sheet 13C has a size larger than or equal to that of each mesh of the sieve sheet 12. To be specific, the size of the first mesh of the sieve sheet 13C, that is, the aperture size, is, for example, 10 to 40 mm, as long as the aperture size is larger than the size of each mesh of the sieve sheet 12. The size of the second mesh of the sieve sheet 13C, that is, the aperture size, is, for example, 15 to 45 mm, as long as the aperture size is larger than the size of the first mesh, that is, the aperture size.

Figure 13:
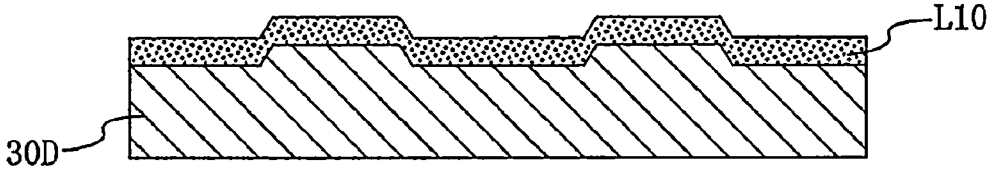
FIG. 13 shows sectional schematic views, in a receiver width direction, illustrating the manner in which a stack of layers in a mat are formed on a receiver of the building material manufacturing apparatus illustrated in FIG. 11.
Figure 13:
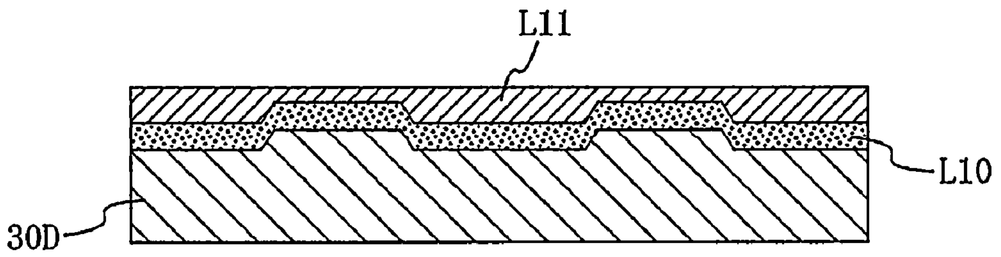
Figure 13:
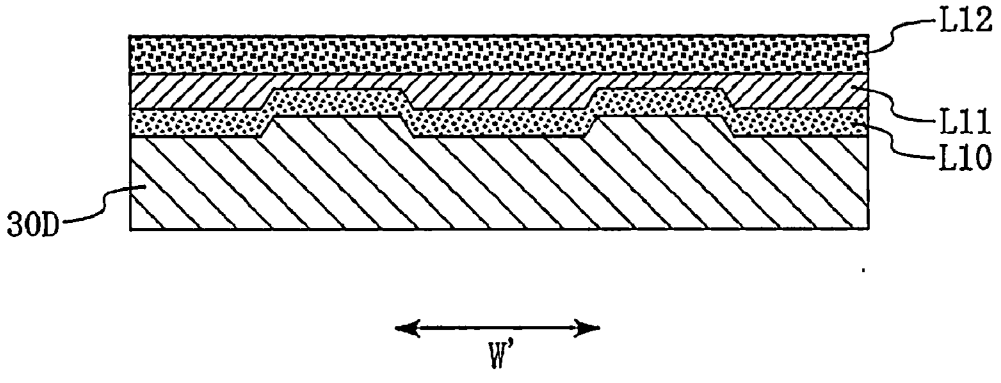

In the present embodiment, the receiver 30D is a template having a predetermined depression/protrusion pattern, corresponding to the design surface of a building material to be manufactured, on an inner surface thereof (a surface that receives the building raw material M). FIG. 13 illustrates a section of an example of the receiver 30D in the receiver width direction W'. The other configurations of the receiver 30D are similar to those of the aforementioned receiver 30.

When the building material manufacturing apparatus X4 configured as described above is operating, the building raw material M is continuously supplied from a raw material storage portion (not shown) to the raw material supply portion 20. The building raw material M is conveyed by the belt conveyor 21 to a position above the receiving sheet 11 of the sieve portion 10C at, for example, a constant speed. On the belt conveyor 21, the building raw material M is leveled by the leveling portion 22 that rotates or by the leveling blades of the leveling portion 22.

Then, in a state in which each of the series of sheets of the sieve portion 10C is performing a wave motion, the building raw material M is dropped from the raw material supply portion 20 toward the receiving sheet 11 of the sieve portion 10C (the raw material dropping path from the raw material supply portion 20 is shown by a broken-line arrow).

The building raw material M supplied from the raw material supply portion 20 is pulverized and dispersed by the receiving sheet 11 that performs a wave motion in the same way as described above regarding the building material manufacturing apparatus X1. Thus, blocking of each sieve sheet of the sieve portion 10C tends to be suppressed.

When the building material manufacturing apparatus X4 is operating, the building raw material M that has been pulverized and dispersed by the receiving sheet 11 that performs a wave motion is screened by each sieve sheet in the process of moving downward on the series of sheets while being pulverized by collision with the other sheets each of which is in a state of performing a wave motion. Then, of the building raw material M produced by being screened in the sieve portion 10C, a part that has passed through the meshes of the sieve sheet 12, a part that has passed through the meshes of the sieve sheet 13C, and a part that has passed through the meshes of the sieve sheet 14 are successively deposited on the receiver 30D and a raw material mat is formed (the raw material dropping paths from the sieve portion 10C are shown by broken-line arrows). The specifics are as follows.

First, the building raw material M that has passed through the meshes of the sieve sheet 12 is deposited on the receiver 30D that is conveyed by the belt conveyor 31 in the direction of the arrow d1 and passing directly below the sieve sheet 12 of the sieve portion 10.

In the sieve sheet 12, as described above, a plurality of meshes having an identical size are arranged at a regular pitch in the sheet width direction W. The building raw material M that has passed through the meshes of the sieve sheet 12 is deposited on the receiver 30D substantially uniformly. Thus, for example, as illustrated in FIG. 13(*a*), the layer L10 (first layer) whose thickness is substantially uniform in the receiver width direction W' corresponding to the sheet width direction W is formed on the receiver 30D. The layer L10 is formed as the fine building raw material M that has passed through the meshes of the sieve sheet 12 (a part that has passed through the sieve sheet 12) is deposited.

Next, the building raw material M that has passed through the meshes of the sieve sheet 13C is deposited on the layer L10 on the receiver 30D that is conveyed by the belt conveyor 31 in the direction of the arrow d1 and passing directly below the sieve sheet 13C of the sieve portion 10C. Thus, for example, as illustrated in FIG. 13(*b*), the layer L11 is formed on the layer L10. The layer L11 is formed as the building raw material M that has passed through the meshes of the sieve sheet 13C (coarser than a part that has passed through the sieve sheet 12) is deposited.

At this time, the deposit amount of the building raw material that forms the layer L11 formed on the layer L10 is larger at a position below a larger mesh of the sieve sheet 13C, and the deposit amount is smaller at a position below a smaller mesh of the sieve sheet 13C.

The building raw material M that has not passed through the meshes of the sieve sheet 13C is pulverized and dispersed by colliding with the relay sheet 15, which does not have any mesh and which has a large raw material contact area, before reaching the sieve sheet 14. The further the building raw material M is pulverized and the further the building raw material M is dispersed before reaching the sieve sheet 14, blocking of the sieve sheet 14 tends to be further suppressed. Even when the building raw material M that does not pass through the meshes of the sieve sheet 13C and moves downward on the sieve sheet 13C quantitatively varies in the sheet width direction W, the quantitative variation is reduced or eliminated in the process in which the building raw material M passes on the relay sheet 15.

Next, the building raw material M that has passed through the meshes of the sieve sheet 14 is deposited on the layer L11 on the receiver 30D that is conveyed by the belt conveyor 31 in the direction of the arrow d1 and passing directly below the sieve sheet 14 of the sieve portion 10C.

In the sieve sheet 14, a plurality of meshes having an identical size, which is larger than the mesh of the sieve sheet 13C, are arranged at a regular pitch in the sheet width direction W. The building raw material M that has passed through the meshes of the sieve sheet 14 is deposited substantially uniformly on the layer L11. Thus, for example, as illustrated in FIG. 13(*c*), a layer L12 (third layer) whose thickness is substantially uniform in the receiver width direction W' is formed on the layer L11. The layer L12 is formed as the building raw material M that has passed through the meshes of the sieve sheet 14 (coarser than a part that has passed through the mesh region of the sieve sheet 13C) is deposited.

The raw material mat formed as described above includes the aforementioned layers L10, L11, and L12. The layer L10 has high uniformity in thickness in the receiver width direction W' and is composed of a relatively fine building raw material M (a part that has passed through the sieve sheet 12). The layer L11 is an element that functions also as a building raw material deposit amount adjustment layer and is composed of a building raw material M that is coarser than a part that has passed through the sieve sheet 12. The layer L12 has high uniformity in thickness in the receiver width direction W' and is composed of a building raw material M that is coarser than a part that has passed through the mesh region of the sieve sheet 13C. The raw material mat that has the layer L11, which functions also as a building raw material deposit amount adjustment layer, in addition to the layers L10 and L12 and that is formed on the receiver 30D is a raw material mat such that the building raw material deposit amount is varied in the receiver width direction W'.

Thus, the building material manufacturing apparatus X4 is suitable to form a raw material mat including the aforementioned layers L10, L11, and L12 while varying the building raw material deposit amount in the receiver width direction W'. The building material manufacturing apparatus X4 is suitable to vary, in the receiver width direction W', the building raw material deposit amount on the receiver 30D, which receives the building raw material M under the sieve portion 10C that screens the building raw material M, while mechanically classifying the building raw material M.

The raw material mat formed in this way, that is, a stack of the layers L10, L11, and L12 is next subjected to a heat-pressing step. The stack of the layers L10, L11, and L12 is subjected to the heat-pressing step or is subjected to the heat-pressing step and the subsequent autoclave curing, and thereby a building material having a staked structure of hardened layers formed from the layers is manufactured.

The hardened layer formed from the layer L10, which is a deposit of a relatively fine building raw material M, has a denser texture and thus is suitable to achieve high waterproof performance, and accordingly, is suitable to form a surface layer of a building material. Each of the hardened layers formed from the layers L11 and L12, each of which is a deposit of a relatively coarse building raw material M, has a sparser and lighter texture and thus is suitable to achieve high cushioning performance, and accordingly, is suitable to form a core layer of a building material.

By heat-pressing a raw material mat including the aforementioned layers L10, L11, and L12, it is possible to manufacture from the raw material mat a building material in which difference in density of texture between a part where a depression is formed in a building material design surface and a part where a protrusion is formed on the building material design surface is suppressed, that is, a building material having low nonuniformity in density. That is, the building material manufacturing apparatus X4 is suitable to manufacture a building material having a depression/protrusion pattern in a design surface thereof while suppressing nonuniformity in density.

Figure 14:
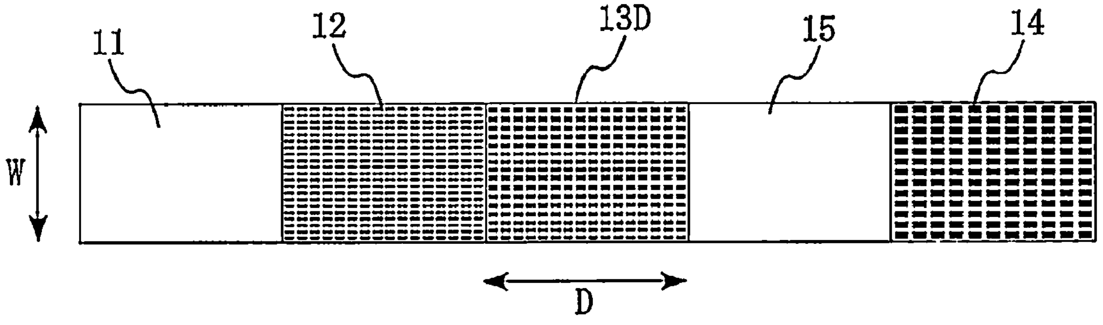
FIG. 14 illustrates the arrangement of sheets in a modification of the building material manufacturing apparatus illustrated in FIG. 11.
Figure 15:
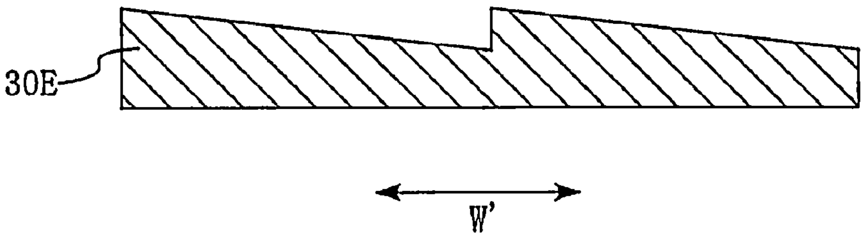
FIG. 15 is a sectional schematic view, in a receiver width direction, of a receiver in the modification of the building material manufacturing apparatus illustrated in FIG. 11.

As illustrated in FIG. 14, the building material manufacturing apparatus X4 may include, in a series of sheets, a sieve sheet 13D (second sieve sheet) instead of the sieve sheet 13C, and a receiver 30E illustrated in FIG. 15 instead of the receiver 30D. FIG. 15 is a sectional schematic view of the receiver 30D in the receiver width direction W'.

In the sieve sheet 13D, a plurality of meshes having two or more different sizes are arranged in the sheet width direction W. The sieve sheet 13D has, in the sheet width direction W, a mesh pattern such that the size of a mesh corresponding to a deeper depression in the inner surface of the receiver 30E is larger. Each mesh of the sieve sheet 13D has a size that is larger than or equal to the mesh of the sieve sheet 12. To be specific, the size of each mesh of the sieve sheet 13D, that is, the aperture size, is, for example, 10 to 45 mm, as long as the aperture size is larger than the size of each mesh of the sieve sheet 12.

Figure 16:
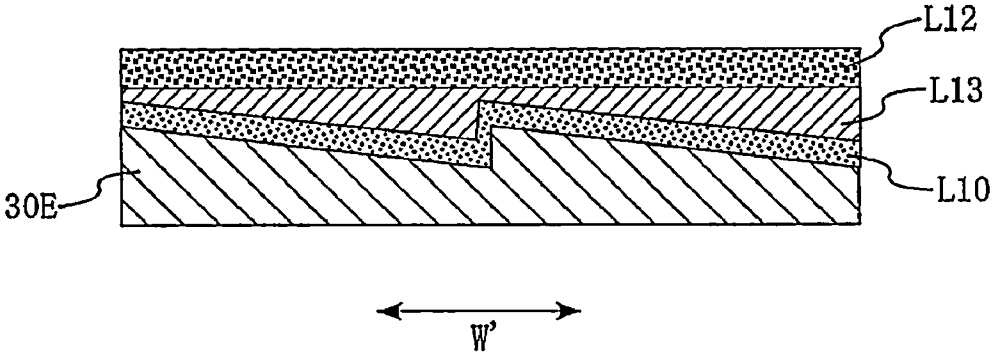
FIG. 16 is a sectional schematic view, in the receiver width direction, illustrating the manner in which a stack of layers in a mat are formed on the receiver in the modification of the building material manufacturing apparatus illustrated in FIG. 11.

As illustrated in FIG. 16, a raw material mat formed by using the building material manufacturing apparatus X4 including the sieve sheet 13D and the receiver 30E, instead of the sieve sheet 13C and the receiver 30D, includes the layers L10, L13, and L12.

As described above, the layer L10 is formed as the fine building raw material M that has passed through the meshes of the sieve sheet 12 (a part that has passed through the sieve sheet 12) is deposited, and has high uniformity in thickness in the receiver width direction W'.

The layer L13 is formed as the building raw material M that has passed through the meshes of the sieve sheet 13D (coarser than a part that has passed through the sieve sheet 12) is deposited. The deposit amount of the building raw material that forms the layer L13 is larger at a position below a larger mesh of the sieve sheet 13D, and the deposit amount is smaller at a position below a smaller mesh of the sieve sheet 13D. The layer L13 is an element that functions also as a building raw material deposit amount adjustment layer in the raw material mat.

The layer L12 is formed as the building raw material M that has passed through the meshes of the sieve sheet 14 (coarser than a part that has passed through the sieve sheet 13D) is deposited, and has high uniformity in thickness in the receiver width direction W'.

The raw material mat that has the layer L13, which functions also as a building raw material deposit amount adjustment layer, in addition to the layers L10 and L12 and that is formed on the receiver 30E is a raw material mat such that the building raw material deposit amount is varied in the receiver width direction W'.

By heat-pressing a raw material mat including the layers L10, L13, and L12, it is possible to manufacture from the raw material mat a building material in which difference in density of texture between a part where a depression is formed in a building material design surface and a part where a protrusion is formed on the building material design surface is suppressed, that is, a building material having low nonuniformity in density. That is, the modification of the building material manufacturing apparatus X4 described above (the modification in which the series of sheets including the sieve sheet 13D illustrated in FIG. 14 and the receiver 30E are used) is also suitable to manufacture a building material having a depression/protrusion pattern in a design surface thereof while suppressing nonuniformity in density, as with the building material manufacturing apparatus X4.

Figure 17:
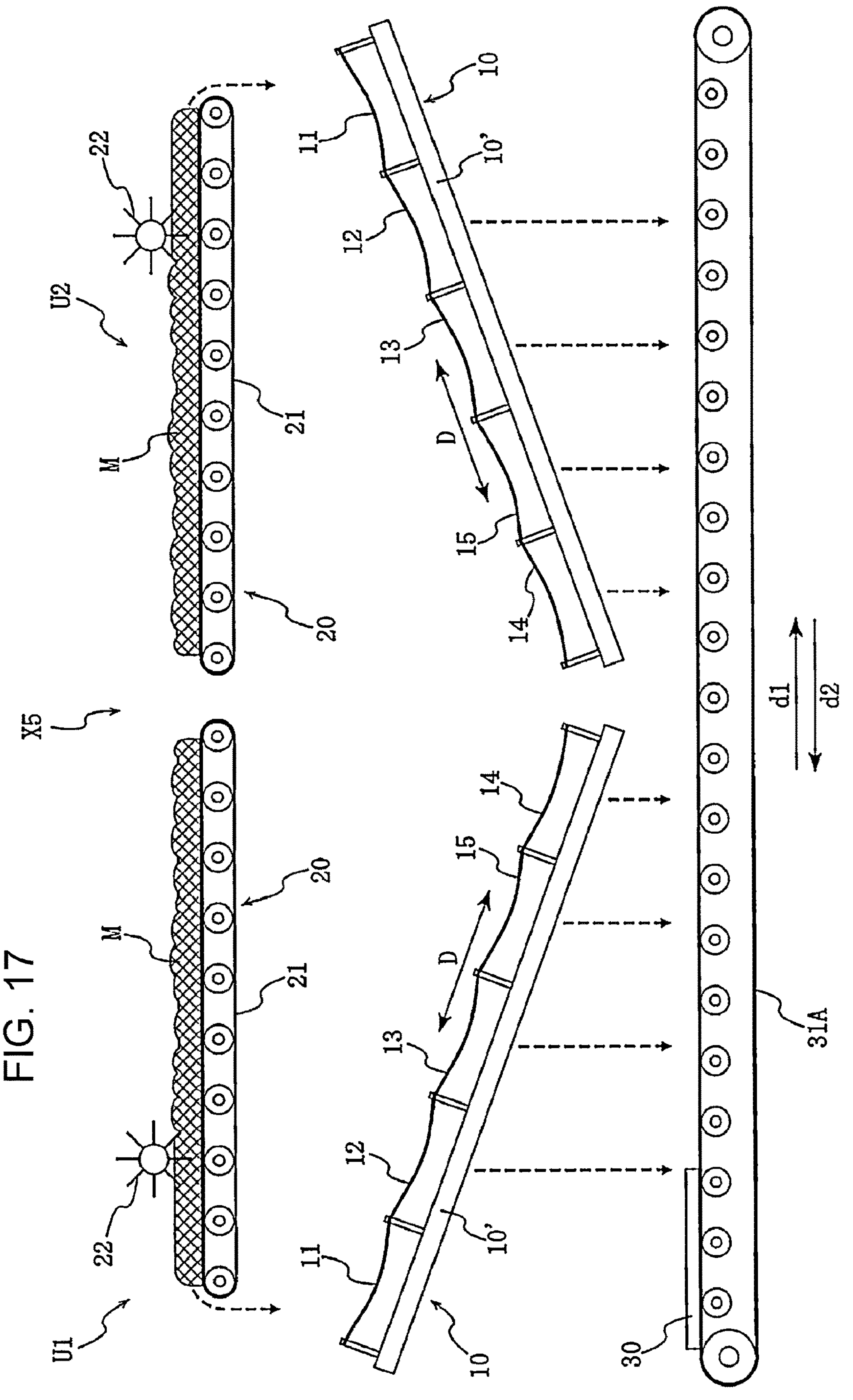
FIG. 17 is a schematic view of a building material manufacturing apparatus according to a fifth embodiment of the present invention.

FIG. 17 is a schematic view of a building material manufacturing apparatus X5 according to a fifth embodiment of the present invention. The building material manufacturing apparatus X5 includes a unit U1, a unit U2, and the receiver 30.

The units U1 and U2 each include the sieve portion 10 and the raw material supply portion 20. As described above, the sieve portion 10 includes: a series of sheets that are each capable of performing a wave motion when the apparatus is operating, that have an inclination, and that are arranged in a direction of the inclination; and a body structure 10' to which the series of sheets are attached to realize the wave motion of each sheet.

In the present embodiment, the series of sheets in the sieve portion 10 of the unit U2 are arranged in an extension region in the arrangement direction D in which a series of sheets are arranged in the sieve portion 10 of the unit U1. In the series of sheets of the sieve portion 10 of the unit U1, a sheet that is closer to the unit U2 is positioned lower, and in the series of sheets of the sieve portion 10 of the unit U2, a sheet that is closer to the unit U1 is positioned lower.

Figure 18:
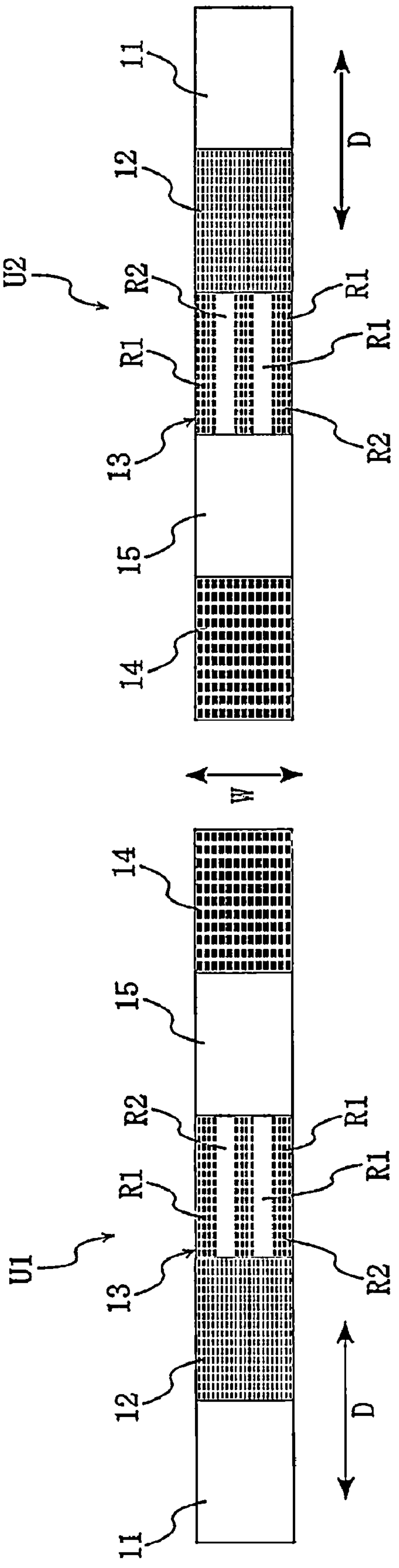
FIG. 18 illustrates the arrangement of sheets in the building material manufacturing apparatus illustrated in FIG. 17.

The series of sheets in the sieve portion 10 includes, as with the building material manufacturing apparatus X1, the receiving sheet 11, the sieve sheet 12 (first sieve sheet), the sieve sheet 13 (second sieve sheet), the sieve sheet 14 (third sieve sheet), and the relay sheet 15. FIG. 18 illustrates the sheet arrangement in the building material manufacturing apparatus X5 or in the units U1 and U2.

In the present embodiment, the receiver 30, for receiving a predetermined building raw material M that has passed through the sieve portions 10 of the two units U1 and U2, is placed on a belt conveyor 31A that forms the movement line of the receiver 30. The receiver 30 moves as the belt conveyor 31A operates, and the receiver 30 is configured to be movable in a region where the receiver 30 can receive the building raw material M that has passed through the sieve portion 10 of the unit U1 and in a region where the receiver 30 can receive the building raw material M that has passed through the sieve portion 10 of the unit U2.

Figure 19:
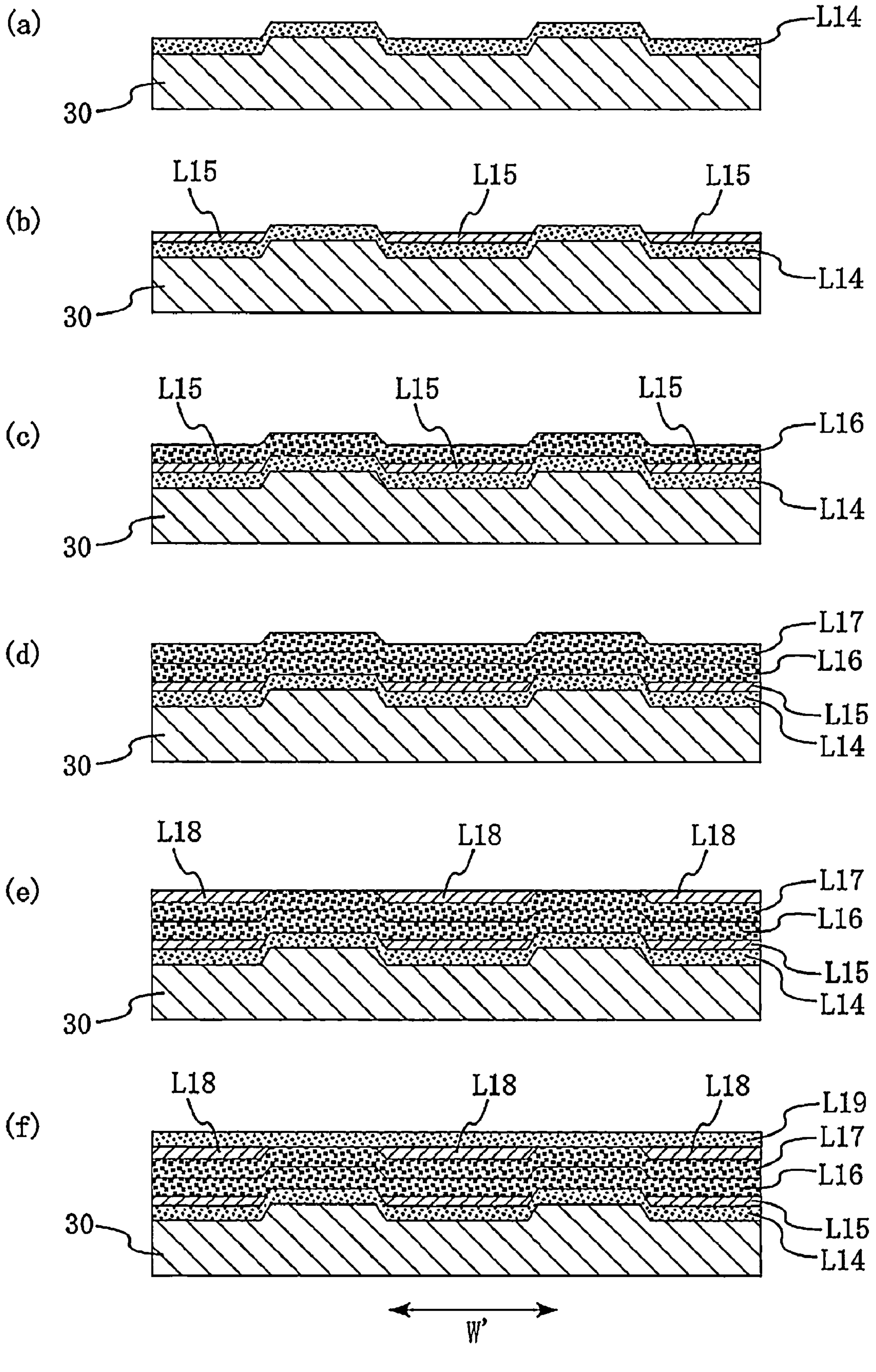
FIG. 19 shows sectional schematic views, in a receiver width direction, illustrating the manner in which a stack of layers in a mat are formed on a receiver in the building material manufacturing apparatus illustrated in FIG. 17.

In the present embodiment, the receiver 30 is a template having a predetermined depression/protrusion pattern, corresponding to the design surface of a building material to be manufactured, on an inner surface thereof (a surface that receives the building raw material M). FIG. 19 illustrates a section of an example of the receiver 30 in the receiver width direction W'.

When the building material manufacturing apparatus X5 is operating, in each of the units U1 and U2, the building raw material M is continuously supplied from a raw material storage portion (not shown) to the raw material supply portion 20. The building raw material M is conveyed by the belt conveyor 21 to a position above the receiving sheet 11 of the sieve portion 10 at, for example, a constant speed. On each belt conveyor 21, the building raw material M is leveled by the leveling portion 22 that rotates or by the leveling blades of the leveling portion 22.

Then, in a state in which each of the series of sheets of the sieve portion 10 is performing a wave motion in each unit, the building raw material M is dropped from the raw material supply portion 20 toward the receiving sheet 11 of the sieve portion 10 (the raw material dropping path from the raw material supply portion 20 is shown by a broken-line arrow).

In each unit, the building raw material M supplied from the raw material supply portion 20 is pulverized and dispersed by the receiving sheet 11 that performs a wave motion in the sieve portion 10 in the same way as described above regarding the building material manufacturing apparatus X1. Thus, blocking of each sieve sheet of the sieve portion 10 tends to be suppressed.

When the building material manufacturing apparatus X5 configured as described above is operating, it is possible to form layers that become a raw material mat from parts of the building raw material M that are generated by screening in the sieve portion 10 of the unit U1, and it is possible to form layers that become a raw material mat from parts of the building raw material M that are generated by screening in the sieve portion 10 of the unit U2 (the raw material drop paths from each sieve portion 10 are shown by broken-line arrows). The specifics are as follows.

First, the building raw material M that has passed through the meshes of the sieve sheet 12 is deposited on the receiver 30 that is conveyed by the belt conveyor 31A in the direction of the arrow d1 and passing directly below the sieve sheet 12 of the sieve portion 10 of the unit U1.

In the sieve sheet 12, because a plurality of meshes having an identical size are arranged at a regular pitch in the sheet width direction W, the building raw material M that has passed through the meshes of the sieve sheet 12 is deposited on the receiver 30 substantially uniformly. Thus, for example, as illustrated in FIG. 19(*a*), the layer L14 (first layer) whose thickness is substantially uniform in the receiver width direction W' corresponding to the sheet width direction W is formed on the receiver 30. The layer L14 is formed as the fine building raw material M that has passed through the meshes of the sieve sheet 12 (a part that has passed through the sieve sheet 12) is deposited.

Next, the building raw material M that has passed through the meshes of the sieve sheet 13 is deposited on the layer L14 on the receiver 30 that is conveyed by the belt conveyor 31A in the direction of the arrow d1 and passing directly below the sieve sheet 13 of the sieve portion 10 of the unit U1.

At this time, for example, as illustrated in FIG. 19(*b*), while the layer L15 (second layer) is formed as the building raw material M is deposited on the layer L14 below the mesh region R1 of the sieve sheet 13, the building raw material M is not substantially deposited below the non-mesh region R2 of the sieve sheet 13. The layer L15 is formed as the building raw material M that has passed through the meshes of the mesh region R1 of the sieve sheet 13 (a part that has passed through the mesh region of the sieve sheet 13, which is coarser than a part that has passed through the sieve sheet 12) is deposited.

The building raw material M that has not passed through the meshes of the mesh region R1 of the sieve sheet 13 is pulverized and dispersed by colliding with the relay sheet 15, which does not have any mesh and which has a large raw material contact area, before reaching the sieve sheet 14.

Next, the building raw material M that has passed through the meshes of the sieve sheet 14 is deposited on the layers L14 and L15 on the receiver 30 that is conveyed by the belt conveyor 31A in the direction of the arrow d1 and passing directly below the sieve sheet 14 of the sieve portion 10 of the unit U1.

In the sieve sheet 14, as described above, a plurality of meshes having an identical size, which is larger than the mesh of the sieve sheet 13, are arranged at a regular pitch in the sheet width direction W. The building raw material M that has passed through the meshes of the sieve sheet 14 is deposited substantially uniformly on the layers L14 and L15. Thus, for example, as illustrated in FIG. 19(*c*), a layer L16 (third layer) whose thickness is substantially uniform in the receiver width direction W' is formed on the layers L14 and L15. The layer L16 is formed as the building raw material M that has passed through the meshes of the sieve sheet 14 (coarser than a part that has passed through the mesh region of the sieve sheet 13) is deposited.

Next, an amount of the building raw material M that has been pulverized and dispersed on the relay sheet 15 of the unit U2, that has reached the sieve sheet 14, and that has passed through the meshes of the sieve sheet 14 is deposited on the layer L16 on the receiver 30 that is conveyed by the belt conveyor 31A in the direction of the arrow d1 and passing directly below the sieve sheet 14 of the sieve portion 10 of the unit U2. Thus, for example, as illustrated in FIG. 19(*d*), a layer L17 (third layer) having a substantially uniform thickness is formed on the layer L16 in the receiver width direction W'. The layer L17 is formed as the building raw material M that has passed through the meshes of the sieve sheet 14 of the unit U2 (a part that has passed through the sieve sheet 14) is deposited.

Next, a part of the building raw material M that has passed through the meshes of the sieve sheet 13 is deposited on the layer L17 on the receiver 30 that is conveyed by the belt conveyor 31A in the direction of the arrow d1 and passing directly below the sieve sheet 13 of the sieve portion 10 of the unit U2. At this time, for example, as illustrated in FIG. 19(*e*), while the layer L18 (second layer) is formed as the building raw material M is deposited on the layer L17 below the mesh region R1 of the sieve sheet 13 of the unit U2, the building raw material M is not substantially deposited below the non-mesh region R2 of the sieve sheet 13. The layer L18 is formed as the building raw material M that has passed through the meshes of the mesh region R1 of the sieve sheet 13 of the unit U2 (finer than a part that has passed through the sieve sheet 14) is deposited.

Next, the building raw material M that has passed through the meshes of the sieve sheet 12 is deposited on the receiver 30 that is conveyed by the belt conveyor 31A in the direction of the arrow d1 and passing directly below the sieve sheet 12 of the sieve portion 10 of the unit U2. Thus, for example, as illustrated in FIG. 19(*f*), a layer L19 (first layer) whose thickness is substantially uniform in the receiver width direction W' corresponding to the sheet width direction W is formed on the layers L17 and L18. The layer L19 is formed as the building raw material M that has passed through the meshes of the sieve sheet 12 of the unit U2 (finer than a part that has passed through the sieve sheet 13) is deposited.

The raw material mat formed as described above includes the aforementioned layers L14 to L19. The layer L14 and L19 each have high uniformity in thickness in the receiver width direction W' and are each composed of a relatively fine building raw material M (a part that has passed through the sieve sheet 12). The layer L15 and L18 are each an element that functions also as a building raw material deposit amount adjustment layer and are each composed of a building raw material M that is coarser than a part that has passed through the sieve sheet 12. The layer L16 and L17 each have high uniformity in thickness in the receiver width direction W' and are each composed of a building raw material M that is coarser than a part that has passed through the mesh region of the sieve sheet 13. The raw material mat that has the layer L15 and L18, each of which functions also as a building raw material deposit amount adjustment layer, in addition to the layers L14, L16, L17, and L19 and formed on the receiver 30 is a raw material mat such that the building raw material deposit amount is varied in the receiver width direction W'.

Thus, the building material manufacturing apparatus X5 is suitable to form a raw material mat including the aforementioned layers L14 to L19 while varying the building raw material deposit amount in the receiver width direction W'. The building material manufacturing apparatus X5 is suitable to vary, in the receiver width direction W', the building raw material deposit amount on the receiver 30, which receives the building raw material M under the sieve portions 10 that screen the building raw material M, while mechanically classifying the building raw material M.

The raw material mat formed in this way, that is, a stack of the layers L14 to L19 is next subjected to a heat-pressing step. The stack of the layers L14 to L19 is subjected to the heat-pressing step or is subjected to the heat-pressing step and the subsequent autoclave curing, and thereby a building material having a staked structure of hardened layers formed from the layers is manufactured.

Each of the hardened layers formed from the L14 and L19, each of which is a deposit of a relatively fine building raw material M, has a denser texture and thus is suitable to achieve high waterproof performance, and accordingly, is suitable to form a surface layer of a building material. Each of the hardened layers formed from the layers L15 to L18, each of which is a deposit of a relatively coarse building raw material M, has a sparser and lighter texture and thus is suitable to achieve high cushioning performance, and accordingly, is suitable to form a core layer of a building material.

By heat-pressing a raw material mat including the aforementioned layers L14 to L19, it is possible to manufacture from the raw material mat a building material in which difference in density of texture between a part where a depression is formed in a building material design surface and a part where a protrusion is formed on the building material design surface is suppressed, that is, a building material having low nonuniformity in density. That is, the building material manufacturing apparatus X5 is suitable to manufacture a building material having a depression/protrusion pattern in a design surface thereof while suppressing nonuniformity in density.

Figure 20:
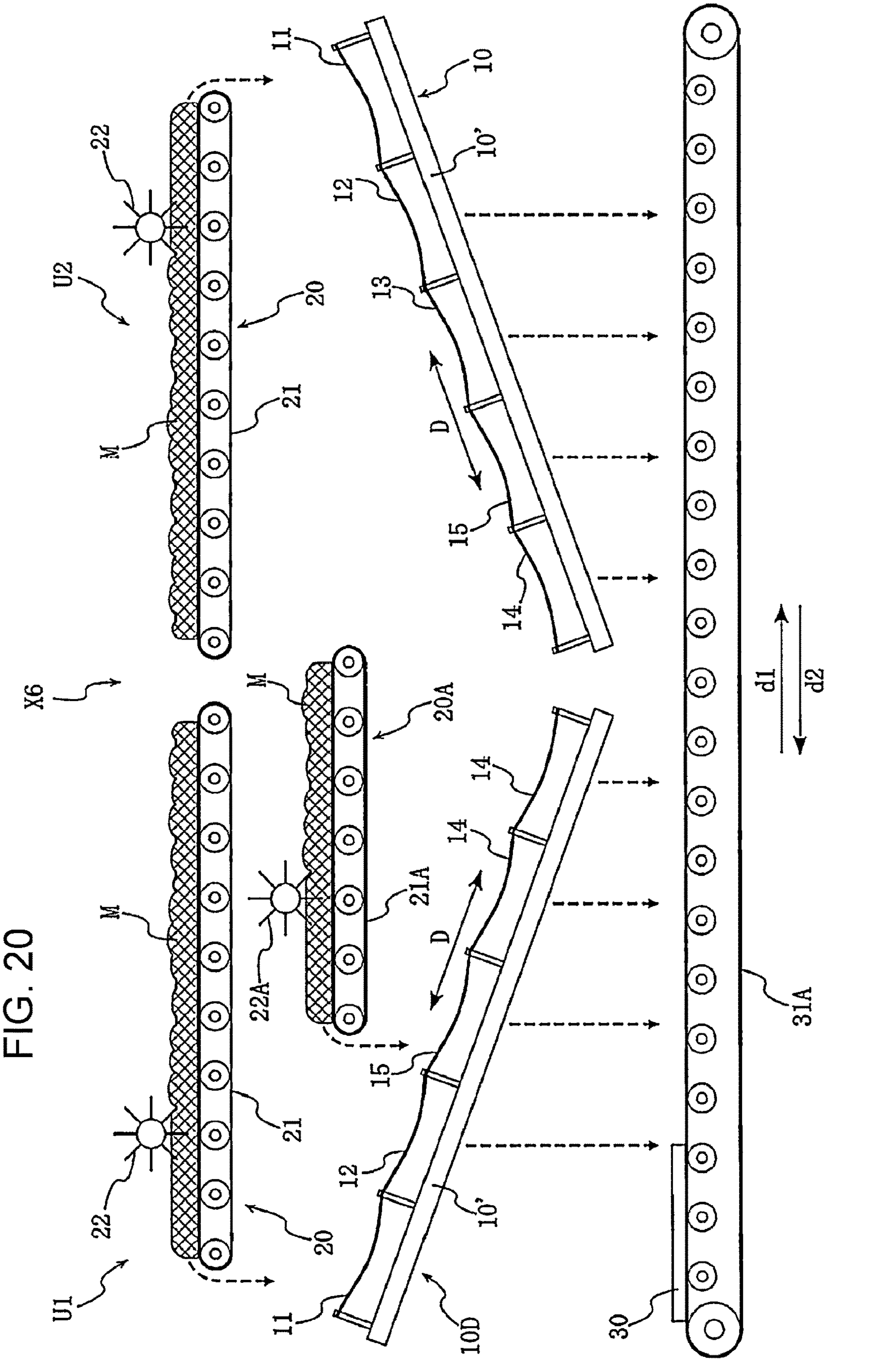
FIG. 20 is a schematic view of a building material manufacturing apparatus according to a sixth embodiment of the present invention.

FIG. 20 is a schematic view of a building material manufacturing apparatus X6 according to a sixth embodiment of the present invention. The building material manufacturing apparatus X6 includes a unit U1, a unit U2, and the receiver 30. The unit U1 of the building material manufacturing apparatus X6 includes a sieve portion 10D, the raw material supply portion 20, and a raw material supply portion 20A. The unit U1 of the building material manufacturing apparatus X6 differs from the unit U1 of the building material manufacturing apparatus X5 in that the unit U1 of the building material manufacturing apparatus X6 includes the sieve portion 10D instead of the sieve portion 10 and further includes the raw material supply portion 20A. The unit U2 and the receiver 30 of the building material manufacturing apparatus X6 have configurations that are the same as those of the unit U2 and the receiver 30 of the building material manufacturing apparatus X5.

Figure 21:
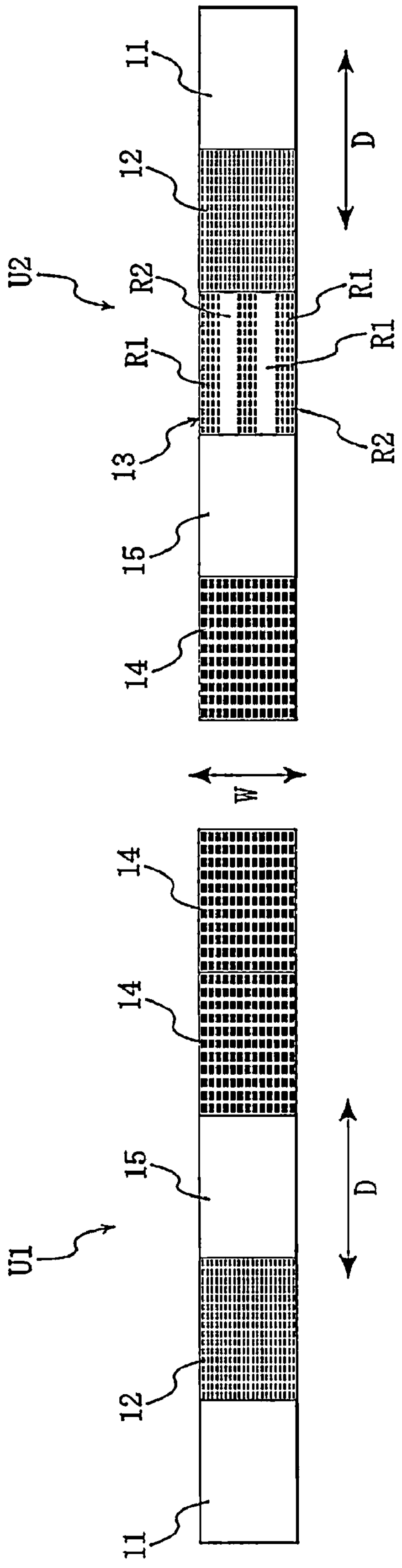
FIG. 21 illustrates the arrangement of sheets in the building material manufacturing apparatus illustrated in FIG. 20.

The sieve portion 10D includes: a series of sheets that are each capable of performing a wave motion when the apparatus is operating, that have an inclination, and that are arranged in a direction of the inclination; and a body structure 10' to which the series of sheets are attached to realize the wave motion of each sheet. The sieve portion 10D of the unit U1 differs from the aforementioned sieve portion 10 in that the sieve portion 10D has a series of sheets that are arranged as illustrated in FIG. 21, instead of the series of sheets that are arranged as illustrated in FIG. 18. The other configurations of the sieve portion 10D are similar to those of the aforementioned sieve portion 10.

In the series of sheets of the sieve portion 10D, from the upper end thereof, the aforementioned non-mesh receiving sheet 11, the aforementioned fine-mesh sieve sheet 12 (first sieve sheet), the relay sheet 15, the aforementioned coarse-mesh sieve sheet 14 (third sieve sheet), and the aforementioned coarse-mesh sieve sheet 14 (third sieve sheet) are arranged in this order. In the sieve portion 10D, the relay sheet 15, which is a non-mesh sheet as with the receiving sheet 11, is positioned between the fine-mesh sieve sheet 12 and the coarse-mesh sieve sheet 14.

In the present embodiment, the raw material supply portion 20A, for supplying a raw material to the sieve portion 10D by dropping an additional building raw material M toward the relay sheet 15 in the sieve portion 10D in the unit U1, has a belt conveyor 21A and a leveling portion 22A. In the present embodiment, the building raw material M supplied from the raw material supply portion 20A has a larger powder size and is coarser than the building raw material M supplied from the raw material supply portion 20. The building raw material M supplied from the raw material supply portion 20A and the building raw material M supplied from the raw material supply portion 20 may have the same composition or may have different compositions.

The belt conveyor 21A conveys the building raw material M to a position above the relay sheet 15 of the sieve portion 10D in the unit U1. The leveling portion 22A is a rotational structure for leveling the building raw material M conveyed on the belt conveyor 21A, and has a plurality of leveling blades standing at the rotational peripheral end thereof. In the present embodiment, the leveling portion 22 is disposed in such a way that the rotational peripheral end of the leveling portion 22A faces the belt conveyor 21A and the rotation axis of the leveling portion 22A perpendicularly intersects the direction in which the belt conveyor 21A conveys the building raw material M.

In view of suppressing or avoiding increase in size of the building material manufacturing apparatus X6 and increase in scale of the entire facility including the building material manufacturing apparatus X6, preferably, the raw material supply portion 20A is disposed above the sieve portion 10D of the unit U1 in such a way that the belt conveyor 21A extends along a horizontal component of the direction in which the series of sheets are arranged in the sieve portion 10D.

In the present embodiment, the relay sheet 15 in the aforementioned sieve portion 10D of the unit U1 extends in a range that is the same as a drop region onto which the building raw material M is dropped from the raw material supply portion 20A or in a range beyond the drop region, in the sheet width direction W shown in FIG. 21 (a direction perpendicular to the sheet arrangement direction D).

When the building material manufacturing apparatus X6 is operating, in each unit, the building raw material M is continuously supplied from a raw material storage portion (not shown) to the raw material supply portion 20. The building raw material M is conveyed by the belt conveyor 21 to a position above the receiving sheet 11 of the sieve portion (the sieve portion 10D, the sieve portion 10) at, for example, a constant speed. On the belt conveyor 21, the building raw material M is leveled by the leveling portion 22 that rotates or by the leveling blades of the leveling portion 22. Then, in a state in which each of the series of sheets of each sieve portion is performing a wave motion, the building raw material M is dropped from the raw material supply portion 20 toward the receiving sheet 11 of the sieve portion (the raw material dropping path from each raw material supply portion 20 is shown by a broken-line arrow).

In each unit, the building raw material M supplied from the raw material supply portion 20 is pulverized and dispersed by the receiving sheet 11 that performs a wave motion in the same way as with the building material manufacturing apparatus X1. Moreover, in the unit U1, the building raw material M that does not pass through the meshes of the sieve sheet 12 by screening by the fine-mesh sieve sheet 12 of the sieve portion 10D is pulverized and dispersed by the relay sheet 15 that performs a wave motion as with the building material manufacturing apparatus X3. Thus, blocking of each sieve sheet in each unit tends to be suppressed.

When the building material manufacturing apparatus X6 is operating, the building raw material M is continuously supplied from another raw material storage portion (not shown) to the raw material supply portion 20A of the unit U1. The building raw material M is conveyed by the belt conveyor 21A to a position above the relay sheet 15 of the sieve portion 10D at, for example, a constant speed. On the belt conveyor 21A, the building raw material M is leveled by the leveling portion 22A that rotates or by the leveling blades of the leveling portion 22A.

Then, in a state in which each of the series of sheets of the sieve portion 10D of the unit U1 is performing a wave motion, the building raw material M is dropped from the raw material supply portion 20A toward the relay sheet 15 of the sieve portion 10D (the raw material dropping path from the raw material supply portion 20A is shown by a broken-line arrow). In the unit U1, the building raw material M dropped from the raw material supply portion 20A to the sieve portion 10D is added, on the relay sheet 15, to the building raw material M that does not pass through the meshes of the sieve sheet 12, after being dropped from the raw material supply portion 20 to the sieve portion 10D.

When the building material manufacturing apparatus X6 configured as described above is operating, it is possible to form layers that become a raw material mat from parts of the building raw material M that are generated by screening in the sieve portion 10D of the unit U1, and it is possible to form layers that become a raw material mat from parts of the building raw material M that are generated by screening in the sieve portion 10 of the unit U2 (the raw material drop paths from each sieve portion are shown by broken-line arrows). The specifics are as follows.

First, the building raw material M that has passed through the meshes of the sieve sheet 12 is deposited on the receiver 30 that is conveyed by the belt conveyor 31A in the direction of the arrow d1 and passing directly below the sieve sheet 12 of the sieve portion 10D of the unit U1.

Figure 22:
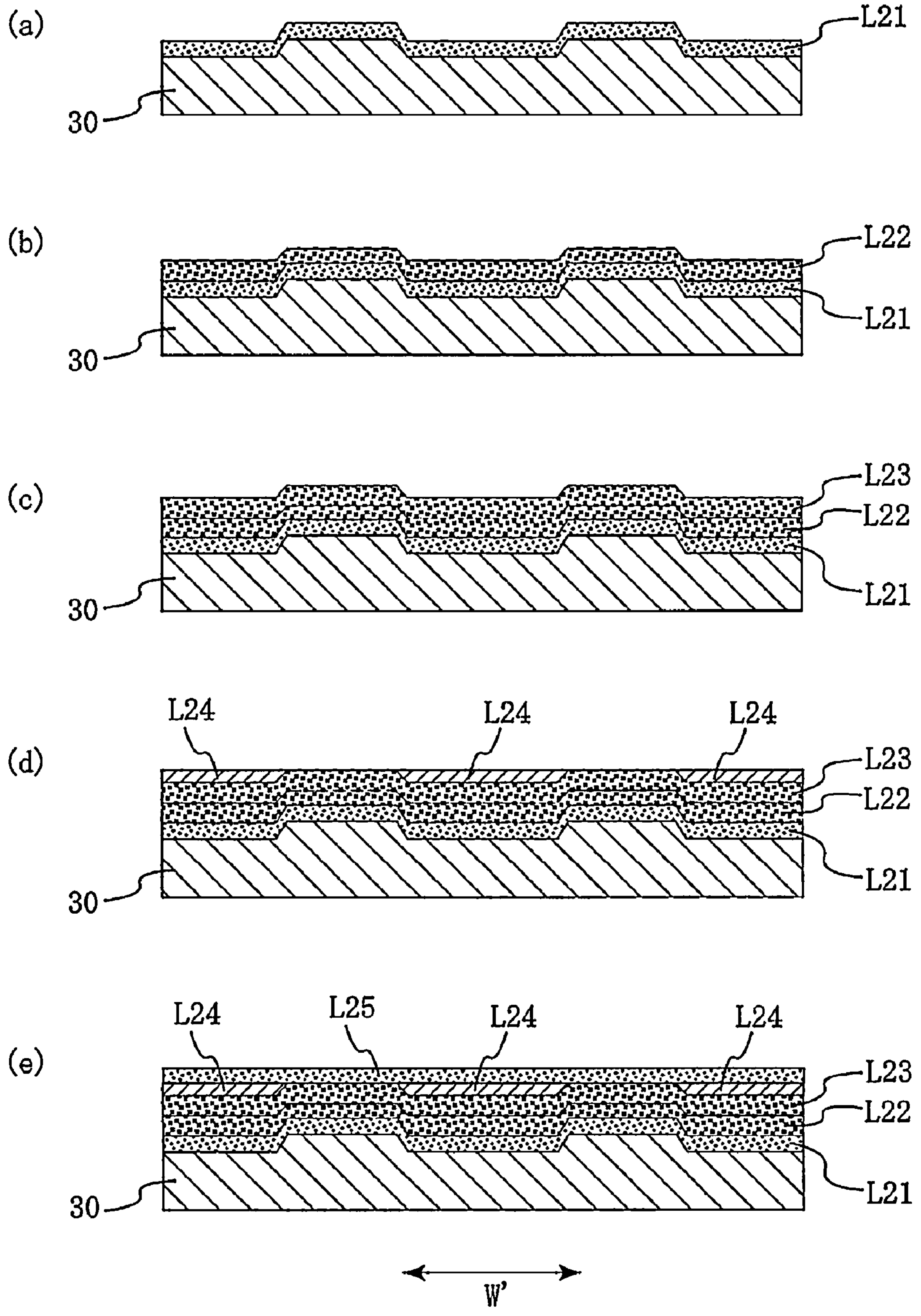
FIG. 22 shows sectional schematic views, in a receiver width direction, illustrating the manner in which a stack of layers in a mat are formed on a receiver of the building material manufacturing apparatus illustrated in FIG. 20.

In the sieve sheet 12, as described above, a plurality of meshes having an identical size are arranged at a regular pitch in the sheet width direction W. The building raw material M that has passed through the meshes of the sieve sheet 12 is deposited on the receiver 30 substantially uniformly. Thus, for example, as illustrated in FIG. 22(*a*), the layer L21 (first layer) whose thickness is substantially uniform in the receiver width direction W' corresponding to the sheet width direction W is formed on the receiver 30. The layer L21 is formed as the fine building raw material M that has passed through the meshes of the sieve sheet 12 (a part that has passed through the sieve sheet 12) is deposited.

Next, the building raw material M that has passed through the meshes of the sieve sheet 14 is deposited on the layer L21 on the receiver 30 that is conveyed by the belt conveyor 31A in the direction of the arrow d1 and passing directly below the sieve sheets 14 (in the present embodiment, the two continuous sieve sheets 14) of the sieve portion 10D of the unit U1.

In the sieve sheet 14, as described above, a plurality of meshes having an identical size, which is larger than the mesh of the sieve sheet 12, are arranged at a regular pitch in the sheet width direction W. The building raw material M that has passed through the meshes of the sieve sheet 14 is deposited substantially uniformly on the layer L21. Thus, for example, as illustrated in FIG. 22(*b*), a layer L22 (third layer) whose thickness is substantially uniform in the receiver width direction W' is formed on the layer L21. The layer L22 is formed as the building raw material M that has passed through the meshes of the sieve sheet 14 (coarser than a part that has passed through the sieve sheet 12) is deposited.

Next, a part of the building raw material M that has been pulverized and dispersed on the relay sheet 15 of the unit U2, that has reached the sieve sheet 14, and that has passed through the meshes of the sieve sheet 14 is deposited on the layer L21 on the receiver 30 that is conveyed by the belt conveyor 31A in the direction of the arrow d1 and passing directly below the sieve sheet 14 of the sieve portion 10 of the unit U2. Thus, for example, as illustrated in FIG. 22(*c*), a layer L23 (third layer) having a substantially uniform thickness is formed on the layer L22 in the receiver width direction W'. The layer L23 is formed as the building raw material M that has passed through the meshes of the sieve sheet 14 of the unit U2 (a part that has passed through the sieve sheet 14) is deposited.

Next, the building raw material M that has passed through the meshes of the sieve sheet 13 is deposited on the layer L23 on the receiver 30 that is conveyed by the belt conveyor 31A in the direction of the arrow d1 and passing directly below the sieve sheet 13 of the sieve portion 10 of the unit U2. At this time, for example, as illustrated in FIG. 22(*d*), while the layer L24 (second layer) is formed as the building raw material M is deposited on the layer L23 below the mesh region R1 of the sieve sheet 13, the building raw material M is not substantially deposited below the non-mesh region R2 of the sieve sheet 13. The layer L24 is formed as the building raw material M that has passed through the meshes of the mesh region R1 of the sieve sheet 13 of the unit U2 (finer than a part that has passed through the sieve sheet 14) is deposited.

Next, the building raw material M that has passed through the meshes of the sieve sheet 12 is deposited on the receiver 30 that is conveyed by the belt conveyor 31A in the direction of the arrow d1 and passing directly below the sieve sheet 12 of the sieve portion 10 of the unit U2. Thus, for example, as illustrated in FIG. 22(*e*), a layer L25 (first layer) whose thickness is substantially uniform in the receiver width direction W' corresponding to the sheet width direction W is formed on the layers L23 and L24. The layer L25 is formed as the building raw material M that has passed through the meshes of the sieve sheet 12 of the unit U2 (finer than a part that has passed through the sieve sheet 13) is deposited.

The raw material mat formed as described above includes the aforementioned layers L21 to L25. The layers L21 and L25 each have high uniformity in thickness in the receiver width direction W' and are each composed of a relatively fine building raw material M (a part that has passed through the sieve sheet 12). The layers L22 and L23 each have high uniformity in thickness in the receiver width direction W' and is composed of a building raw material M that is coarser than a part that has passed through the mesh region of the sieve sheet 13. The layer L24 is an element that functions also as a building raw material deposit amount adjustment layer and is composed of the building raw material M that is coarser than a part that has passed through the sieve sheet 12. The raw material mat that has the layer L24, which functions also as a building raw material deposit amount adjustment layer, in addition to the layers L21, L22, L23, and L25 and that is formed on the receiver 30 is a raw material mat such that the building raw material deposit amount is varied in the receiver width direction W'.

Thus, the building material manufacturing apparatus X6 is suitable to form a raw material mat including the aforementioned layers L21 to L25 while varying the building raw material deposit amount in the receiver width direction W'. The building material manufacturing apparatus X6 is suitable to vary, in the receiver width direction W', the building raw material deposit amount on the receiver 30, which receives the building raw material M under the sieve portions 10D and 10 that screen the building raw material M, while mechanically classifying the building raw material M.

The raw material mat formed in this way, that is, a stack of the layers L21 to L25 is next subjected to a heat-pressing step. The stack of the layers L21 to L25 is subjected to the heat-pressing step or is subjected to the heat-pressing step and the subsequent autoclave curing, and thereby a building material having a hardened layer formed from each layer is manufactured.

Each of the hardened layers formed from the layers L21 and L25, each of which is a deposit of a relatively fine building raw material M, has a denser texture and thus is suitable to achieve high waterproof performance, and accordingly, is suitable to form a surface layer of a building material. Each of the hardened layers formed from the layers L22 to L24, each of which is a deposit of a relatively coarse building raw material M, has a sparser and lighter texture and thus is suitable to achieve high cushioning performance, and accordingly, is suitable to form a core layer of a building material.

By heat-pressing a raw material mat including the aforementioned layers L21 to L25, it is possible to manufacture from the raw material mat a building material in which difference in density of texture between a part where a depression is formed in a building material design surface and a part where a protrusion is formed on the building material design surface is suppressed, that is, a building material having low nonuniformity in density. That is, the building material manufacturing apparatus X6 is suitable to manufacture a building material having a depression/protrusion pattern in a design surface thereof while suppressing nonuniformity in density.

REFERENCE SIGNS LIST

X1 to X6 building material manufacturing apparatus
U1, U2 unit
10, 10A, 10B, 10C, 10D sieve portion
11 receiving sheet
12, 13, 14 sieve sheet
R1 mesh region
R2 non-mesh region
15 relay sheet
D sheet arrangement direction
W sheet width direction
20, 20A raw material supply portion
21, 21A belt conveyor
22, 22A leveling portion
30, 30A, 30B, 30C, 30D, 30E receiver
W' receiver width direction
31, 31A conveyance line

The invention claimed is:

1. A building material manufacturing apparatus comprising:

a sieve portion including a series of sheets that are each capable of performing a wave motion when the apparatus is operating, that have an inclination, and that are arranged in a direction of the inclination, the series of sheets including a first sieve sheet and a second sieve sheet that is positioned below the first sieve sheet, the first sieve sheet being a sheet in which a plurality of meshes having an identical size are arranged at a regular pitch in a sheet width direction of the series of sheets, the second sieve sheet being a sheet in which a plurality of meshes having two or more different sizes are arranged in the sheet width direction or being a sheet that has a mesh region and a non-mesh region that are arranged in the sheet width direction; and a receiver for receiving a building raw material that has passed through the meshes of the sieve portion, the receiver being movable under the series of sheets.

2. The building material manufacturing apparatus according to claim 1, wherein a size of each mesh of the second sieve sheet is larger than a size of each mesh of the first sieve sheet.

3. The building material manufacturing apparatus according to claim 1, wherein the second sieve sheet has the mesh region in each of two end portions thereof in the sheet width direction and has at least one of the non-mesh region between the mesh regions.

4. The building material manufacturing apparatus according to claim 1, wherein the series of sheets include a third sieve sheet that is positioned below the second sieve sheet, the third sieve sheet being a sheet in which a plurality of meshes having an identical size, which is larger than a size of each mesh of the first sieve sheet, are arranged at a regular pitch in the sheet width direction.

5. The building material manufacturing apparatus according to claim 1, wherein the series of sheets include a third sieve sheet that is positioned between the first sieve sheet and the second sieve sheet, the third sieve sheet being a sheet in which a plurality of meshes having an identical size, which is larger than a size of each mesh of the first sieve sheet, are arranged at a regular pitch in the sheet width direction.

6. A building material manufacturing method, implemented by using:

a sieve portion including a series of sheets that have an inclination and that are arranged in a direction of the inclination, the series of sheets including a first sieve sheet and a second sieve sheet that is positioned below the first sieve sheet, the first sieve sheet being a sheet in which a plurality of meshes having an identical size are arranged at a regular pitch in a sheet width direction of the series of sheets, the second sieve sheet being a sheet in which a plurality of meshes having two or more different sizes are arranged in the sheet width direction or being a sheet that has a mesh region and a non-mesh region that are arranged in the sheet width direction; and a receiver for receiving a building raw material that has passed through the meshes of the sieve portion, the receiver being movable under the series of sheets, the method comprising:

in a state in which each of the series of sieve sheets is performing a wave motion, screening a building raw material by using the series of sieve sheets; and forming, on the receiver, a mat including a first layer formed from a building raw material that has passed through the meshes of the first sieve sheet and a second layer formed above the first layer from a building raw material that has passed through the meshes of the second sieve sheet.

7. The building material manufacturing method according to claim 6, wherein a size of each mesh of the second sieve sheet is larger than a size of each mesh of the first sieve sheet.

8. The building material manufacturing method according to claim 6, wherein the second sieve sheet has the mesh region in each of two end portions thereof in the sheet width direction and has at least one of the non-mesh region between the mesh regions.

9. The building material manufacturing method according to claim 6, wherein the series of sheets include a third sieve sheet that is positioned below the second sieve sheet, the third sieve sheet being a sheet in which a plurality of meshes having an identical size, which is larger than a size of each mesh of the first sieve sheet, are arranged at a regular pitch in the sheet width direction, and wherein the method comprises forming, on the receiver, a mat including a first layer formed from a building raw material that has passed through the meshes of the first sieve sheet, a second layer formed above the first layer from a building raw material that has passed through the meshes of the second sieve sheet, and a third layer formed above the second layer from a building raw material that has passed through the meshes of the third sieve sheet.

10. The building material manufacturing method according to claim 6, wherein the series of sheets include a third sieve sheet that is positioned between the first sieve sheet and the second sieve sheet, the third sieve sheet being a sheet in which a plurality of meshes having an identical size, which is larger than a size of each mesh of the first sieve sheet, are arranged at a regular pitch in the sheet width direction, and wherein the method comprises forming, on the receiver, a mat including a first layer formed from a building raw material that has passed through the meshes of the first sieve sheet, a third layer formed above the first layer from a building raw material that has passed through the meshes of the third sieve sheet, and a second layer formed above the third layer from a building raw material that has passed through the meshes of the second sieve sheet.

* * * * *